US009591483B2

United States Patent
Shen et al.

(10) Patent No.: US 9,591,483 B2
(45) Date of Patent: *Mar. 7, 2017

(54) AUTHENTICATION MECHANISMS FOR WIRELESS NETWORKS

(71) Applicant: MICROSOFT TECHNOLOGY LICENSING, LLC, Redmond, WA (US)

(72) Inventors: Hui Shen, Sammamish, WA (US); Amer A. Hassan, Kirkland, WA (US); Yi Lu, Sammamish, WA (US); Thomas W. Kuehnel, Seattle, WA (US); Andrew T. Baron, Redmond, WA (US); Deyun Wu, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 5 days.

This patent is subject to a terminal disclaimer.

(21) Appl. No.: 14/806,985

(22) Filed: Jul. 23, 2015

(65) Prior Publication Data
US 2015/0327067 A1 Nov. 12, 2015

Related U.S. Application Data

(63) Continuation of application No. 12/035,531, filed on Feb. 22, 2008, now Pat. No. 9,105,031.

(51) Int. Cl.
*H04L 29/06* (2006.01)
*H04W 12/06* (2009.01)
(Continued)

(52) U.S. Cl.
CPC ............ *H04W 12/06* (2013.01); *G06Q 30/02* (2013.01); *H04L 9/30* (2013.01); *H04L 9/3263* (2013.01);
(Continued)

(58) Field of Classification Search
CPC .......... G06Q 30/0267; G06Q 30/0251; H04W 48/08; H04W 48/16
See application file for complete search history.

(56) References Cited

U.S. PATENT DOCUMENTS

| 5,724,588 A | 3/1998 | Atkinson et al. |
| 5,850,444 A | 12/1998 | Rune |

(Continued)

FOREIGN PATENT DOCUMENTS

| CN | 1631010 A | 6/2005 |
| CN | 1757195 | 4/2006 |

(Continued)

OTHER PUBLICATIONS

Guttman, "Service Location Protocol: Automatic Discovery of IP Network Services", Sun Microsystems, IEEE Internet Computing, Jul.-Aug. 1999.

(Continued)

*Primary Examiner* — Carl Colin
*Assistant Examiner* — Gary Lavelle
(74) *Attorney, Agent, or Firm* — Dan Choi; John Jardine; Micky Minhas

(57) ABSTRACT

Security techniques and security mechanisms for wireless networks that transmit content such as advertisements. According to exemplary techniques, control messages comprising unrequested content (e.g., advertisement data) may be transmitted in response to a request from a client device, while in other exemplary techniques the control messages may be transmitted without any request from a client device. In some exemplary implementations, security mechanisms such as public key cryptography algorithms may be used to secure transmissions. In some of these techniques which implement public key cryptography, a user may be required to retrieve a public key from a source other than the wireless (Continued)

access point transmitting encrypted advertisements (e.g., a sign or terminal in a commercial entity transmitting such advertisements, or from a web service), such that the user may confirm that the encrypted content is from a source matching the retrieved public key and thus confirm the authenticity of a wireless access point.

20 Claims, 10 Drawing Sheets

(51) Int. Cl.
    *H04W 12/08*     (2009.01)
    *H04W 12/04*     (2009.01)
    *H04L 9/30*     (2006.01)
    *H04W 12/10*     (2009.01)
    *H04L 9/32*     (2006.01)
    *G06Q 30/02*     (2012.01)
    *H04W 48/08*     (2009.01)
    *H04W 48/16*     (2009.01)

(52) U.S. Cl.
    CPC ............ *H04L 9/3271* (2013.01); *H04L 63/12* (2013.01); *H04L 63/123* (2013.01); *H04W 12/04* (2013.01); *H04W 12/08* (2013.01); *H04W 12/10* (2013.01); *G06Q 30/0251* (2013.01); *G06Q 30/0267* (2013.01); *H04L 2209/56* (2013.01); *H04L 2209/60* (2013.01); *H04L 2209/805* (2013.01); *H04W 48/08* (2013.01); *H04W 48/16* (2013.01)

(56) References Cited

U.S. PATENT DOCUMENTS

| | | |
|---|---|---|
| 6,002,941 A | 12/1999 | Ablay et al. |
| 6,282,183 B1 | 8/2001 | Harris |
| 6,353,398 B1 | 3/2002 | Amin et al. |
| 6,452,498 B2 | 9/2002 | Stewart |
| 6,522,881 B1 | 2/2003 | Feder |
| 6,532,368 B1 | 3/2003 | Hild et al. |
| 6,633,757 B1 | 10/2003 | Hermann et al. |
| 6,659,947 B1 | 12/2003 | Carter et al. |
| 6,728,232 B2 | 4/2004 | Hasty, Jr. et al. |
| 6,763,014 B2 | 7/2004 | Kennedy |
| 6,842,460 B1 | 1/2005 | Olkkonen et al. |
| 6,862,737 B1 | 3/2005 | Iwamura |
| 6,892,052 B2 | 5/2005 | Kotola et al. |
| 6,909,706 B2 | 6/2005 | Wilmer et al. |
| 6,909,721 B2 | 6/2005 | Ekberg |
| 6,952,715 B1 | 10/2005 | Kronz |
| 6,957,086 B2 | 10/2005 | Bahl et al. |
| 6,961,560 B2 | 11/2005 | Hermann et al. |
| 6,966,714 B2 | 11/2005 | Harris et al. |
| 6,993,326 B2 | 1/2006 | Link |
| 7,024,552 B1 | 4/2006 | Caswell et al. |
| 7,046,647 B2 | 5/2006 | Oba et al. |
| 7,054,627 B1 | 5/2006 | Hillman |
| 7,120,420 B2 | 10/2006 | Karaoguz et al. |
| 7,130,289 B2 | 10/2006 | Kuan |
| 7,155,167 B1 | 12/2006 | Carty |
| 7,233,991 B2 | 6/2007 | Adhikari |
| 7,243,233 B2 | 7/2007 | Kindberg et al. |
| 7,269,260 B2 | 9/2007 | Adachi et al. |
| 7,272,407 B2 | 9/2007 | Strittmatter |
| 7,313,111 B2 | 12/2007 | Hietalahti et al. |
| 7,359,363 B2 | 4/2008 | Sakai |
| 7,359,989 B2 | 4/2008 | Orava et al. |
| 7,366,511 B2 | 4/2008 | Jaakkola et al. |
| 7,370,362 B2 | 5/2008 | Olson et al. |
| 7,403,512 B2 | 7/2008 | Tsai |
| 7,412,518 B1 | 8/2008 | Duigou |
| 7,421,582 B2 | 9/2008 | Fu et al. |
| 7,477,746 B2 | 1/2009 | Kang et al. |
| 7,505,443 B2 | 3/2009 | McNew et al. |
| 7,505,595 B2 | 3/2009 | Lee et al. |
| 7,613,426 B2 | 11/2009 | Kuehnel |
| 7,617,317 B2 | 11/2009 | Jones et al. |
| 7,680,494 B2 | 3/2010 | Karaoguz et al. |
| 7,861,283 B2 | 12/2010 | Kobayashi |
| 7,903,646 B2 | 3/2011 | Ikeda |
| 8,116,287 B2 | 2/2012 | Krantz |
| 8,281,010 B2 | 10/2012 | Ansari et al. |
| 8,478,300 B2 | 7/2013 | Kuehnel |
| 8,559,350 B2 | 10/2013 | Kuehnel |
| 9,109,903 B2 | 8/2015 | Wu |
| 2001/0010689 A1 | 8/2001 | Atwater et al. |
| 2001/0041568 A1 | 11/2001 | Hughes et al. |
| 2002/0032746 A1 | 3/2002 | Lazaridis |
| 2002/0083121 A1 | 6/2002 | Chang et al. |
| 2002/0120750 A1 | 8/2002 | Nidd |
| 2002/0138564 A1 | 9/2002 | Treptow |
| 2002/0160817 A1 | 10/2002 | Salmimaa et al. |
| 2002/0176579 A1 | 11/2002 | Deshpande et al. |
| 2003/0009758 A1 | 1/2003 | Townsend et al. |
| 2003/0045280 A1 | 3/2003 | Simons |
| 2003/0065851 A1 | 4/2003 | Layman |
| 2003/0100315 A1 | 5/2003 | Rankin |
| 2003/0158922 A1 | 8/2003 | Park |
| 2003/0196115 A1 | 10/2003 | Karp |
| 2003/0208595 A1 | 11/2003 | Gouge et al. |
| 2003/0217289 A1 | 11/2003 | Ammon et al. |
| 2003/0228842 A1 | 12/2003 | Heinonen et al. |
| 2004/0006705 A1 | 1/2004 | Walker |
| 2004/0009769 A1 | 1/2004 | Yokoyama |
| 2004/0023640 A1 | 2/2004 | Ballai |
| 2004/0066756 A1 | 4/2004 | Ahmavaara et al. |
| 2004/0068653 A1 | 4/2004 | Fascenda |
| 2004/0076279 A1 | 4/2004 | Tasehereau |
| 2004/0077336 A1 | 4/2004 | Lauriol |
| 2004/0087274 A1 | 5/2004 | Ekberg et al. |
| 2004/0102215 A1 | 5/2004 | Karr et al. |
| 2004/0106408 A1 | 6/2004 | Beasley et al. |
| 2004/0152416 A1 | 8/2004 | Dahl |
| 2004/0170134 A1 | 9/2004 | Furuyama et al. |
| 2004/0176117 A1 | 9/2004 | Strittmatter et al. |
| 2004/0203890 A1 | 10/2004 | Karaoguz et al. |
| 2004/0208151 A1 | 10/2004 | Haverinen et al. |
| 2004/0213409 A1 | 10/2004 | Murto et al. |
| 2004/0246983 A1 | 12/2004 | Kaatz |
| 2004/0253948 A1 | 12/2004 | Laberteaux |
| 2005/0021725 A1 | 1/2005 | Lobbert |
| 2005/0032556 A1 | 2/2005 | Bennett |
| 2005/0041634 A1 | 2/2005 | Aura |
| 2005/0058109 A1 | 3/2005 | Ekberg |
| 2005/0078644 A1 | 4/2005 | Tsai et al. |
| 2005/0083929 A1 | 4/2005 | Salo et al. |
| 2005/0096047 A1 | 5/2005 | Haberman |
| 2005/0099985 A1 | 5/2005 | Callaway et al. |
| 2005/0128958 A1 | 6/2005 | Hamdan |
| 2005/0147073 A1 | 7/2005 | Hietalahti et al. |
| 2005/0164678 A1 | 7/2005 | Rezvani et al. |
| 2005/0176420 A1 | 8/2005 | Graves et al. |
| 2005/0185660 A1 | 8/2005 | Ekberg et al. |
| 2005/0186949 A1 | 8/2005 | Ho |
| 2005/0193106 A1 | 9/2005 | Desai et al. |
| 2005/0197136 A1 | 9/2005 | Friday |
| 2005/0232242 A1 | 10/2005 | Karaoguz et al. |
| 2005/0255839 A1 | 11/2005 | Pertiila |
| 2005/0255844 A1 | 11/2005 | Sugaya et al. |
| 2005/0260972 A1 | 11/2005 | Karaoguz et al. |
| 2005/0282556 A1 | 12/2005 | Morrie |
| 2006/0030265 A1 | 2/2006 | Desai et al. |
| 2006/0034256 A1 | 2/2006 | Addagatla et al. |
| 2006/0036517 A1 | 2/2006 | Walter |
| 2006/0039337 A1 | 2/2006 | Hodoshima |
| 2006/0047835 A1 | 3/2006 | Greaux |
| 2006/0078123 A1 | 4/2006 | Bichot et al. |
| 2006/0089138 A1 | 4/2006 | Smith et al. |
| 2006/0094456 A1 | 5/2006 | Rittle et al. |
| 2006/0126579 A1 | 6/2006 | Kim et al. |
| 2006/0133414 A1 | 6/2006 | Luoma et al. |
| 2006/0153151 A1 | 7/2006 | Huang |

(56) References Cited

U.S. PATENT DOCUMENTS

| | | |
|---|---|---|
| 2006/0187889 A1 | 8/2006 | Mehta et al. |
| 2006/0189298 A1 | 8/2006 | Marcelli |
| 2006/0209773 A1 | 9/2006 | Hundal et al. |
| 2006/0217131 A1 | 9/2006 | Alizadeh-Shabdiz et al. |
| 2006/0223527 A1 | 10/2006 | Lee |
| 2006/0227972 A1 | 10/2006 | Brok |
| 2006/0253559 A1 | 11/2006 | Espina Perez et al. |
| 2006/0262932 A1 | 11/2006 | Sood |
| 2006/0268896 A1 | 11/2006 | Kotola et al. |
| 2006/0282514 A1 | 12/2006 | Saint-Hilaire et al. |
| 2007/0006098 A1 | 1/2007 | Krumm et al. |
| 2007/0025371 A1 | 2/2007 | Krantz |
| 2007/0026856 A1 | 2/2007 | Krantz et al. |
| 2007/0032219 A1 | 2/2007 | Rudolf et al. |
| 2007/0036119 A1 | 2/2007 | Haddad |
| 2007/0097904 A1 | 5/2007 | Mukherjee et al. |
| 2007/0117548 A1 | 5/2007 | Fernandez-Alonso |
| 2007/0118587 A1 | 5/2007 | Ishikawa et al. |
| 2007/0123260 A1 | 5/2007 | Kim et al. |
| 2007/0140214 A1 | 6/2007 | Zoltan |
| 2007/0141984 A1 | 6/2007 | Kuehnel |
| 2007/0141986 A1 | 6/2007 | Kuehnel |
| 2007/0141988 A1 | 6/2007 | Kuehnel et al. |
| 2007/0147313 A1 | 6/2007 | Braam et al. |
| 2007/0147324 A1 | 6/2007 | McGary |
| 2007/0150570 A1 | 6/2007 | Eastham et al. |
| 2007/0218875 A1 | 9/2007 | Calhoun et al. |
| 2007/0242643 A1 | 10/2007 | Chandra et al. |
| 2007/0242645 A1 | 10/2007 | Stephenson et al. |
| 2007/0264968 A1 | 11/2007 | Frank et al. |
| 2007/0264974 A1 | 11/2007 | Frank |
| 2007/0264991 A1 | 11/2007 | Jones et al. |
| 2008/0261574 A1 | 10/2008 | Rinta-Aho |
| 2008/0261591 A1 | 10/2008 | Laumen |
| 2008/0276303 A1 | 11/2008 | Gast |
| 2008/0285670 A1 | 11/2008 | Walton et al. |
| 2009/0031398 A1 | 1/2009 | Zheng et al. |
| 2009/0094111 A1 | 4/2009 | Wu |
| 2009/0144201 A1 | 6/2009 | Gierkink et al. |
| 2009/0214036 A1 | 8/2009 | Shen |
| 2012/0022948 A1 | 1/2012 | Jones |

FOREIGN PATENT DOCUMENTS

| | | |
|---|---|---|
| EP | 1 220 552 A1 | 7/2002 |
| EP | 1 227 689 A1 | 7/2002 |
| EP | 1 253 539 A2 | 10/2002 |
| EP | 1 298 847 A1 | 4/2003 |
| EP | 1 370 050 A1 | 12/2003 |
| EP | 1 494 394 A1 | 1/2005 |
| EP | 1 509 003 A2 | 2/2005 |
| EP | 1 727 310 A1 | 11/2006 |
| EP | 1 760 654 A1 | 3/2007 |
| JP | 2001/298467 A | 10/2001 |
| JP | 2003/258808 A2 | 9/2003 |
| JP | 2004-179872 A | 6/2004 |
| JP | 2004-235976 A | 8/2004 |
| JP | 2004-248072 A | 9/2004 |
| JP | 2004-254311 A | 9/2004 |
| JP | 2005-050793 A | 2/2005 |
| JP | 2005/328231 A | 11/2005 |
| KR | 1999/023310 A | 3/1999 |
| KR | 20000017730 A | 4/2000 |
| KR | 20060002649 A | 1/2006 |
| RU | 2 349 056 C2 | 3/2009 |
| WO | 98/54870 A2 | 12/1998 |
| WO | 01/86486 A3 | 11/2001 |
| WO | 02/01812 A2 | 1/2002 |
| WO | 03/081373 A2 | 10/2003 |
| WO | 2004/004918 A1 | 1/2004 |
| WO | 2004/089016 A1 | 10/2004 |
| WO | 2004086667 A2 | 10/2004 |
| WO | 2005/060416 A3 | 7/2005 |
| WO | 2005/069582 A1 | 7/2005 |
| WO | 2006/096389 A1 | 9/2006 |
| WO | 2007/019689 A1 | 2/2007 |

OTHER PUBLICATIONS

Delamer, "A Peer-to-Peer Discovery Protocol for Semantic Web Services in Industrial Embedded Controllers", In Proceedings of the 31st Annual Conference of IEEE Industrial Electronics (IECON 2005), Nov. 6-10, 2005.

CN Notice on the First Office Action for Application No. 200780017769.2, Jan. 6, 2012.

Edwards, "Core Jini", Prentice Hall PTR, 1st Edition, pp. 68 and 76, Jun. 25, 1999.

CN Notice on the Fifth Office Action for Application No. 200980106136.8, Oct. 20, 2014.

CN Notice on the Fourth Office Action for Application No. 200980106136.8, Apr. 15, 2014.

TW Search Report for Application No. 098103913, Jan. 14, 2014.

CN Notice on the Third Office Action for Application No. 200980106136.8, Nov. 18, 2013.

Jones, "What Where Wi: An Analysis of Millions of Wi-Fi Access Points", Proceedings of the IEEE International Conference on Portable Information Devices, Mar. 25-29, 2007.

Koskela, "Combining WLAN Indoor Positioning and Multimedia Messaging Services", From Proceedings of Internet and Multimedia Systems and Applications, Aug. 13-15, 2003.

Quigley, "BlueStar, a privacy centric location aware system", Proceedings of the IEEE Position Location and Navigation Symposium (PLANS), Apr. 26-29, 2004.

CN Notice on the Second Office Action for Application No. 200980106136.8, May 6, 2013.

CN Notice on the First Office Action for Application No. 200980106136.8, Aug. 27, 2012.

Chandra et al., "Beacon-Stuffing: Wi-Fi Without Associations," IEEE Communications Society, Feb. 2007. Available at http://research.microsoft.com/users/alecw/hotrnobile-2007.pdf.

Cisco Systems, The Benefits of Centralization in Wireless LANs via the Cisco Unified Wireless Network, White Paper, Feb. 2006, 13 pages., http://www.cisco.com/application/pdf/en/us/guest/products/ps6521/c1650/cdccont_0900aecd8040f7b2.pdf.

Davies et al, "Using and Determining Location in a Context-Sensitive Tour Guide," Computer, vol. 34, Issue 8, Aug. 2001, pp. 35-41.

DiSorte et al., "Beacon-Based Service Publishing Framework in Multiservice Wi-Fi Hotspots," EURASIP Journal on Wireless Communications and Networking, vol. 2007, Article ID 38463, Hindawai Publishing Corporation, 18 pages, 2004. http://hindawi.com/GetPDF.aspx?doi=10.1155/2007/38463.

Friday et al., "Supporting Service Discovery, Querying and Interaction in Ubiquitous Computing Environments," Wireless Networks, 2004, pp. 631-641, vol. 10, Kluwer Academic Publishers, The Netherlands. http://delivery.acm.org/I0.1145/1040000/1035680/p631-friday.pdf?key1=1035680&key2=6630472311&coll=GUIDE&dl=GUIDE&CFID=58960884&CFTOKEN=5973545.

Hamalainen, "Business Models Based on Facilities Bundling: Success Criteria," Helsinki University of Technology, Networking Laboratory, pp. 1-6, 2006. http://www.netlab.tkk.fi/opetus/s383042/2006/papers_pdf/D1.pdf.

Helal et al., "Konark—A Service Discovery and Delivery Protocol for Ad-Hoc Networks," 2003, pp. 1-7, University of Florida, Gainesville, Florida. http://media.csee.ltu.se/reading/papers/konark_cnc2003.pdf.

Hodes et al., "Composable ad hoc location-based services for heterogeneous mobile clients," Wireless Networks, No. 5, 1999.

International Search Report from International Application No. PCT/US2008/077442 mailed Mar. 31, 2009.

International Search Report from International Application No. PCT/US01/15099 mailed Sep. 25, 2002.

International Search Report and Written Opinion from International Application No. PCT/US2007/007745 mailed Sep. 12, 2007.

(56) References Cited

OTHER PUBLICATIONS

International Search Report and Written Opinion for International Application No. PCT/US2007/011636, mailed Dec. 20, 2007.
International Search Report and Written Opinion for International Application No. PCT/US2007/011654, mailed Dec. 18, 2007.
International Search Report and Written Opinion from International Application No. PCT/US2006/048924, mailed Jun. 19, 2007.
Jamaluddin et al., Hotring Advertising Model for Broadband Hotspots, IEEE Communications Society, WCNC 2004, pp. 2064-2068, 2004. http://ieeexolore.ieee.org/iel5/9178/29117/01311403.pfd?isNumber.
802.11 Beacons Revealed http://wi-figurus.com/index2.php?option=com_content&do_pdf=1&id=47, 2 pages, Mar. 19, 2007.
Klein et al., "Service Rings—A Semantic Overlay for Service Discovery in Ad hoc Networks," Institute for Program Structures and Data Organisation, Universitat Kalsruhe, Karlsruhn, Germany, 7 pages, 2003. http://citeseer.ist.psu.edu/cache/papers/cs/27184/http:zSzzSzwww.ipd.uka.dezSzDIANEzSzenzSzinhaltezez..zSz..zSzdocszSzNBIS2003.pdf/klein03service.pdf.
International Search Report mailed Jun. 29, 2009, from corresponding International Application No. PCT/US2009/031451.
Krumm et al., "The NearMe Wireless Proximity Server," UbiComp 2004, The Sixth International Conference on Ubiquitous Computing, pp. 283-300, Sep. 7-10, 2004, Nottingham, England. http://research.microsoft.com/users/kenh/papers/NearMe.pdf.
Lenders et al., "Service Discovery in Mobile Ad Hoc Networks: A Field Theoretic Approach," Swiss Federal Institute of Technology (ETH Zurich), Switzerland, 11 pages, 2005. http://www.tik.ee.ethz.ch/~lenders/publication/lenders wowmom05.pdf *Partly founded by the Swiss National Science Foundation (SNF) under grant 200021-103578.
Meier, et al., "Proximity-Based Service Discovery in Mobile Ad Hoc Networks," Distributed Systems Group, Department of Computer Science, Trinity College, Dublin, Ireland, 15 pages, 2005. http://www.es.tcd.ie/publications/tech-reports/reports.05/TCD-CS-2005-35.pdf.
Munson et al., "Flexible Internet working of Devices and Controls," Industrial Electronics Society, 1999, the 25th Annual Conference of the IEEE San Jose, CA, USA, Nov. 29 to Dec. 3, 1999, pp. 1139-1145.
Pagurek et al., "Management of Advanced Services in H.323 Internet Protocol Telephony," Proceedings IEEE INFOCOM, The Conference on Computer Communications, Tel Aviv, Israel, Mar. 26, 2000.
Poupyrev, et al., "Service Discovery in TinyObj: Strategies and Approaches," The Graduate School of Frontier Science, Tokyo University, Peter Davis, Adaptive Communications Research Laboratories, ATR, 4 pages, 2008. http://www.medien.ifi.lmu.de/permid2005/pdf/PavelPoupyrev_Permid2005.pdf.
New Networking Features in Windows Server 2008 and Windows Vista http://technet.microsoft.com/en-gb/library/bb726965(d=printer).aspx, 30 pages, Apr. 25, 2007.
Raverdy et al., "A Multi-Protocol Approach to Service Discovery and Access in Pervasive Environments," 7 pages, 2006. http://www-c.inria.fr/plastic/test-1/raverdy_mobiquitous.pdf.
Rekimoto et al., "Proximal Interactions: A Direct Manipulation Technique for Wireless Networking," 2003, pp. 1-8, Sony Computer Science Laboratories, Inc., Tokyo, Japan. http://www.idemployee.id.tue.nl/g.w.m.rauterberg/conferences/INTERACT2003/INTERACT2003-p511.pdf.
Samulowitz et al., "Adaptive Interaction for Enabling Pervasive Services," 2001, pp. 20-26, http://delivery.acm.org/10.1145/380000/376886/p20-samulowitz.pddf?Key1=376886&key2=4070384811&coll=GUIDE&dl=GUIDE&CFID=28883839&CFTOKEN=55961476.
STMicroelectronics, "Dual-band IEEE 802.11a/b/g mobile Wi-Fi solution," Product Description, Feb. 2006, 2 pages, http://www.st.com/stonline/products/promlit/pdf/fldua10206.pdf.
Trevor et al., "The Use of Adapters to Support Cooperative Sharing," Proceedings of the Conference on Computer Supported Cooperative Work, pp. 219-230, Oct. 22, 1994.
Wojtiuk, "Bluetooth and WiFi integration: Solving co-existence challenges," Semiconductor Technology, Oct. 2004, pp. 20-26, http://rfdesign.com/mag/410rfdfl.pdf.
Melnikov, "Open Solutions for Location Based Services in WLAN Environment," Tampere University of Technology, Pori, Finland, Mar. 2004, 65 pages http://trc.pori.tut.fi/tots/Diplomityo_Henry_Melnikov.pdf.
Polk, et al., "Dynamic Host Configuration Protocol Option for Coordinate-based Location Configuration Information," Network Working Group, Standards Track, Jul. 2004, 13 pages. http://www.ietf.org/rfc/rfc3825.txt.
International Search Report dated Feb. 17, 2009 from corresponding International Application No. PCT/US2008/077388.
Wong, W.H., et al., "Wireless LAN Positioning with Mobile Devices in a Library Environment," Distributed Computing Systems Workshops, 2005, 25th IEEE International Conference, Jun. 6, 2005, pp. 633-636.
U.S. Appl. No. 12/035,531, filed Feb. 22, 2008, Hui Shen.
U.S. Appl. No. 11/434,393, filed May 15, 2006, David Jones.
U.S. Appl. No. 13/250,655, filed Sep. 20, 2011, David Jones.

AUTHENTICATION MECHANISMS FOR WIRELESS NETWORKS

RELATED APPLICATIONS

This application is a Continuation of, and claims benefit from, U.S. patent application Ser. No. 12/035,531 that was filed on Feb. 22, 2008, and that is incorporated herein by reference in its entirety.

BACKGROUND OF INVENTION

Conventional web-based advertising frameworks typically transmit advertisements to consumers of a web-based service through a connection that the client device has established, through a network, to a server hosting the web-based service. For example, the owner/administrator of a server may configure the server to transmit to the client device a web page with an advertisement in response to a user of a client device entering a Uniform Resource Locator (URL) into the client device. The advertisement may be in the form of text/image/video/audio data and may be embedded in the web page, or may be an initial web page to be displayed to the user prior to displaying the web page accessed by the client device.

In such advertising frameworks, advertisements are exchanged between a web-based service (e.g., a web site) and users of the web-based service. The network to which a user's client device connects and through which the client device accesses the web-based service has limited involvement in controlling the content of the web page and thus has limited capability to provide advertisements to a user of the client device. Instead, some networks implement alternative, complementary advertising frameworks, for example, ones which transmit web pages containing advertisements to users of client devices connected to the network. The advertising frameworks implemented by these networks, for example, may require a user of the network to view an initial web page when first connecting to the network, or may periodically transmit web pages containing advertisements to client devices using the network.

SUMMARY OF INVENTION

Conventional advertising frameworks for wireless networks are limited in their ability to transmit advertisements to users, as the advertisements may only be transmitted to client devices with an established connection to the wireless network and/or which are requesting data from the wireless network. If advertisements could be transmitted to client devices not connected to a wireless network, then the advertisements may reach more users and advertising businesses may draw more customers and more revenue.

Enabling client devices to accept openly unrequested content from networks to which they are not connected, however, may open users of the devices to various risks. For example, undesirable advertisements (e.g., pornographic advertisements) may be transmitted by a organization in which a user is not interested, or by a malicious party masquerading as an organization in which the user is interested. Without any security mechanisms and/or methods of identifying the networks transmitting advertisements and other content, such undesirable advertisements may be received by a client device and displayed to the user and may cause offense or outrage to the user.

Frameworks other than advertising frameworks may also benefit from being able to transmit unrequested content to client devices and, in turn, these client devices may benefit from security mechanisms and/or methods of identifying networks transmitting unrequested content. For example, wireless access points may transmit location data for themselves to client devices tracking their own locations, and confirming the identity of these wireless access points may prevent malicious parties from broadcasting fraudulent location data.

Disclosed herein are various principles for security techniques and security mechanisms for wireless networks which transmit content such as advertisements. According to some of the exemplary techniques, control messages comprising unrequested content (e.g., advertisement data) may be transmitted in response to a request from a client device, while in other exemplary) techniques the control messages may be transmitted without any request from a client device. In some exemplary implementations, security mechanisms such as public key cryptography algorithms may be used to secure transmissions. In some of these techniques which implement public key cryptography, a user may be required to retrieve a public key from a source other than the wireless access point transmitting encrypted advertisements (e.g., a sign or terminal in a commercial entity transmitting such advertisements, or from a web service), such that the user may confirm that the encrypted content is from a source matching the retrieved public key and thus confirm the authenticity of a wireless access point.

In one embodiment, there is provided a method of operating a client device to display advertisement information relating to a commercial service. The method comprises obtaining trust information for a wireless access point, verifying, based on the trust information, the authenticity of a control transmission from the wireless access point, and selectively displaying to a user an advertisement for at least one commercial service contained within the control message based at least in part on the act of verifying.

In another embodiment, there is provided at least one computer-readable medium encoded with computer-executable instructions which, when executed, cause a computer to execute a method for confirming authenticity of a control transmission from a wireless access point associated with an entity. The method comprises obtaining trust information for the entity, verifying, using the trust information, the authenticity of a control transmission from the wireless access point, and selectively using contents of the control transmission based at least in part on the act of verifying.

In a further embodiment, there is provided an apparatus for transmitting control messages in a wireless network. The apparatus comprises at least one data store storing trust information and contents, at least one processor adapted to construct a control transmission comprising the contents and to encrypt at least a portion of the control transmission using the trust information, and a communication circuit to transmit the control transmission.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
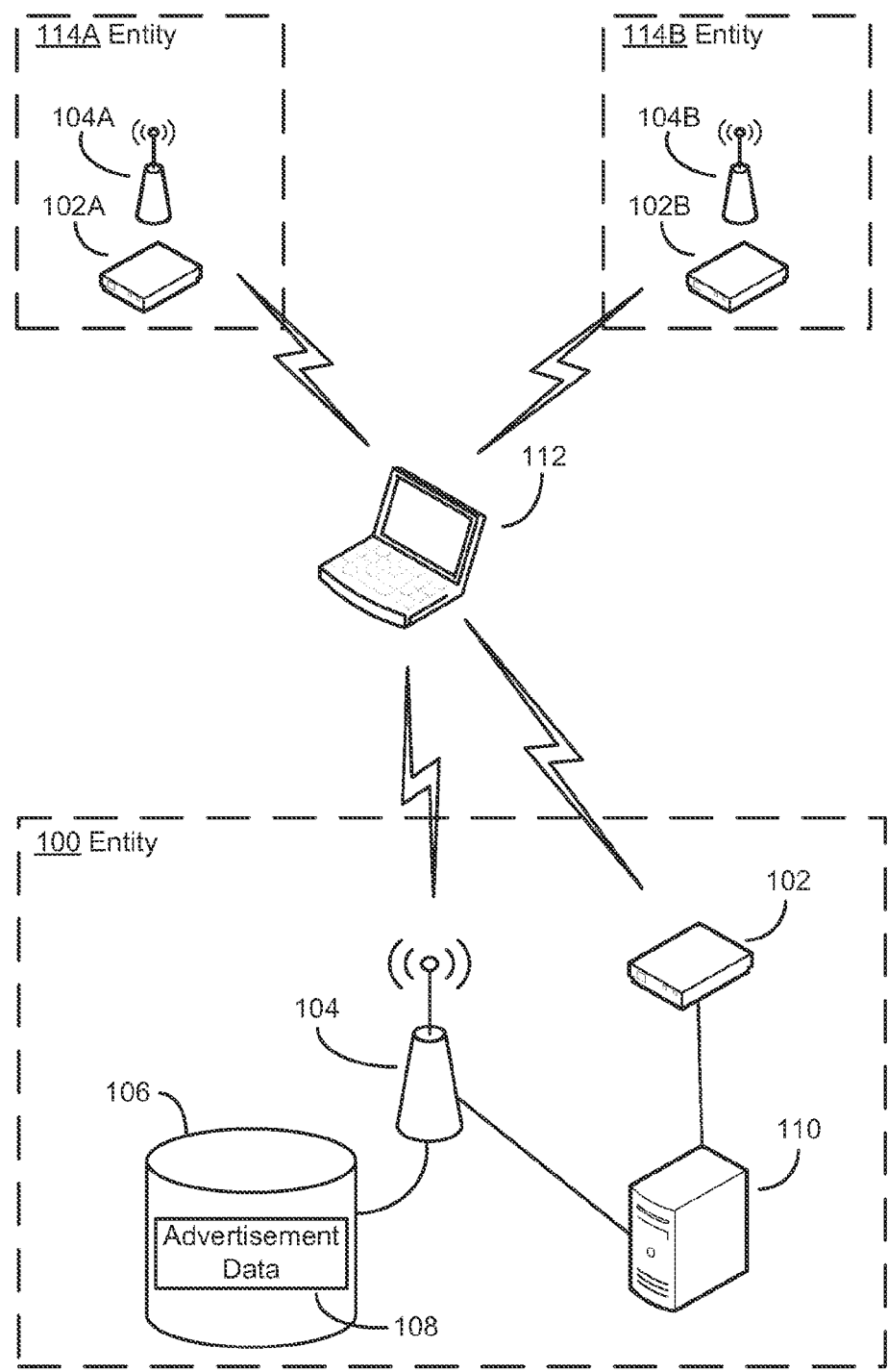
FIG. 1A is a diagram of an exemplary computer system in which some, but not all, of the techniques disclosed herein for transmitting, receiving, and verifying the authenticity of control messages may act, the computer system comprising kiosks from which trust information for entities may be read.

Applicants have appreciated that both businesses and consumers may benefit from a simple mechanism for making computer-based advertisements available to consumers in close proximity, for example, to the locations at which advertised services are available. For example, users may learn of sales or special promotions offered by a business. Also, the user can learn about services offered by a business to determine that the user is interested in the services offered by the business before entering the premises for that business.

Conversely, advertisers may focus advertisements on potential customers who are near their establishments and therefore most likely to make purchases. For example, a restaurant having a wireless network may seek to draw more customers by transmitting to client devices within range a description of the restaurant's daily specials. Conventional advertising frameworks cannot deliver advertisements in this fashion. While capable of transmitting advertisements to large numbers of users, conventional frameworks are limited to displaying advertisements to users of client device already connected to a wireless network through a wireless access point who request data from the wireless network. Such conventional frameworks are not capable of displaying advertisements to users not connected to the wireless network or alerting users who do not know to request information that advertisements are available for businesses in close proximity to the user.

Applicants have appreciated the desirability of advertising services of a business, including services such as selling one or more products, to users of client devices not connected to a wireless network operated by the business. If businesses were capable of advertising their products or services to all client devices within range of their wireless networks, rather than just client devices connected to the wireless networks, then the advertisements would be able to reach a wider audience and the business might attract more customers and more revenue. Further, users of client devices within range of the wireless network are the most likely group of potential customers because of their proximity to the business when they receive the transmitted advertisements.

Applicants have additionally appreciated, however, that enabling client devices to receive openly content from nearby networks and displaying that content to a user without verifying the authenticity of the networks and/or content opens the user to various risks. For example, advertisements in which a user is not interested may be displayed, and/or advertisements which are offensive to a user may be displayed. For example, a user walking through a shopping mall may walk within range of a business selling goods that the user finds undesirable (e.g., pornography) and the user may find any advertisement for the business undesirable or offensive. Further, if a client device displays all received advertisements to a user, then a malicious third party may set up a fraudulent wireless network and transmit advertisements that appear to be for a legitimate source but which are actually offensive or undesirable images and/or text that the client device would automatically display to a user.

Additionally, Applicants have appreciated that frameworks other than advertising frameworks may benefit from transmitting unrequested content through wireless networks to client devices and that those client devices may benefit from confirming the identity of those networks prior to accepting the content. For example, a wireless access point broadcasting data indicating the location of the wireless access point may be helpful to a client device, within range of the wireless access point, attempting to ascertain its own location. Without any techniques in place for confirming the identity of wireless access points and/or wireless networks, however, the client device, in this scenario, is open to accepting fraudulent location data from a malicious third party. Other frameworks that exchange information wirelessly with client devices may similarly benefit from the techniques disclosed herein.

Applicants have therefore appreciated that desirability of security mechanisms for wireless networks to enable client devices to confirm the identity of wireless networks prior to accepting unrequested information from the wireless networks. Security mechanisms may permit a user and/or a client device to verify the authenticity of a control message from a wireless access point containing content (e.g., an advertisement, location data, or other information). Alternatively or additionally, the security mechanisms may be used to verify the authenticity of a wireless network comprising one or more wireless access points transmitting control messages, or any other component of any suitable framework before content is displayed to the user. Additionally, security mechanisms may permit a user to limit content the user wishes the client device to use (e.g., the content selected to be displayed to the user).

In view of the foregoing, techniques have been devised which are directed to security mechanisms for confirming the identity of wireless networks. In one exemplary technique, a user receives trust information for one or more commercial entities, verifies the authenticity of one or more control transmissions or network components using the trust information, and selectively displays content contained in the one or more control transmissions from those commercial entities based on the success of the verification.

Any suitable transmission may be a control transmission in accordance with one or more of the principles described herein. For example, layer 2 control transmissions such as announcement transmissions may comprise any suitable information about a wireless access point, including one or more network characteristics enabling a client device receiving the control transmission to open a connection to the wireless access point. An announcement transmission may be, for example, a beacon in accordance with an Institute of Electrical and Electronics Engineers (IEEE) 802.11 wireless protocol periodically broadcast by a wireless access point to all client devices within range of the wireless access point, a probe response transmitted to a client device in response to a request for control information sent by the client device, or any other suitable announcement transmission sent by a wireless access point. Control transmissions sent by a client device to a wireless access point may be any suitable transmission, such as a probe requesting control information about the wireless access point and/or wireless network which may or may not comprise test data, an authentication test message of any suitable type, and/or any other suitable transmission.

In some, but not all, implementations of the techniques described herein the security techniques may be implemented as a one- or two-way public key encryption algorithm. In implementations which do use public key encryption, any suitable public key algorithm may be used, such as the popular Rivest-Shamir-Adleman (RSA) public key algorithm, though the invention is not limited to implementing any particular security technique or any particular public key algorithm.

In some implementations, such as those implementing public key cryptography, a user or a client device may obtain trust information from an "out of band" source (i.e., a source other than through the wireless network itself) such as a book, sign, key service, electronic key provider, a kiosk or other device communicating using one or more protocols such as the Near-Field Communication (NFC) protocol, or any other suitable source. The trust information may be, in some implementations, a public key associated with a wireless network or wireless access point and/or a Public Key Infrastructure (PKI) certificate approved by a certificate authority. As described in greater detail below, a client device having trust information for a wireless network or wireless access point may use the trust information in any suitable manner to confirm the identity of the wireless access point and/or wireless network.

For example, in some techniques implementing some of the principles described herein, a wireless access point may transmit control transmissions encrypted using a private key corresponding to a public key retrieved by the client device as part or all of the trust information. In some implementations, the control transmissions may be entirely encrypted, while in alternative transmissions only a portion or all of the control transmission payload (e.g., contents such as advertisement data, or information elements comprising one or more pieces of content) are transmitted. If the client device is able to correctly decrypt the control message using the public key, the client device can confirm that the control message was encrypted using a private key corresponding to the retrieved public key and, accordingly, the wireless access point transmitting the encrypted control message is the wireless access point from which the client device expected to receive information.

Additionally or alternatively, in some implementations, the client device may exchange one or more test transmissions as control transmissions to test the authenticity of a wireless access point and/or wireless network. For example, a client device may encrypt test data using the trust information (e.g., the retrieved public key) and transmit the encrypted test data to the wireless access point. If the control transmission received from the wireless access point in response to the test transmission contains the correct test data, then the client device can confirm that the wireless access point was able to correct decode the transmission, and as such the wireless access point has the private key corresponding to the public key and is the wireless access point with which the client device expected to communicate. Greater security may be provided by adding other information to the test data. This other information may be any suitable information, such as a public key of a client device, and replies sent by the wireless access point may be sent encrypted using the public key of the client device. Alternatively, the test data could be a nonce or other unique symbol (e.g., unique text or a transmission time) so that even if a control transmission from a wireless access point is intercepted, recorded, and rebroadcast from a hoax device (to make the hoax device appear authentic), the client device may detect that the control transmission is being "replayed" by using one or more techniques for avoiding reply attacks, such as by noting the repetition of what should have been a unique symbol or an unusual delay in the transmission time (i.e., an extreme difference between a current time and the claimed transmission time of the control transmission may imply that the control transmission had been recorded at the transmission time and rebroadcast by a hoax device at a later time).

It should be appreciated that these techniques are merely illustrative of techniques that may implement the principles described herein, and that the principles described herein for confirming the identity of wireless networks may be implemented in any suitable manner using any suitable security mechanism, as the invention is not limited in this respect.

It should be additionally appreciated that control transmissions may be formatted in any suitable manner to contain any suitable type or types of contents (e.g., advertisement data and/or location data). Exemplary techniques for encapsulating contents in information elements of control transmissions are discussed in co-pending application Ser. No. 11/973,589 ("Advertising framework for wireless networks") and Ser. No. 11/973,590 ("Transmitting location data in wireless networks"). These applications describe using, among other formats, information elements of the IEEE 802.11 wireless communication protocol to include advertisement and location data in control transmissions such as beacons and probe responses. The principles described herein, however, may be implemented using any suitable control transmission incorporating contents in any suitable manner, and are not limited to the techniques discussed therein.

The techniques described herein may be implemented in any suitable system comprising one or more wireless networks, each comprising one or more wireless access points and any suitable means for the client device to obtain trust information for wireless networks, as the invention is not limited in this respect. Described below are three exemplary systems which implement some of the principles described herein.

FIG. 1A shows an exemplary system in which some of the techniques disclosed herein may act. It should be appreciated that embodiments of the invention may act in any suitable system and are not limited to being implemented in the illustrative system shown in FIG. 1A.

The system of FIG. 1A comprises an exemplary client device 112 within range of three wireless access points 104, 104A, and 104B. Each of the wireless access points shown in FIG. 1A is associated with an entity, such as entity 100, entity 114, and entity 116. In some embodiments of the invention, an entity may be a commercial entity such as a business, collection or association of businesses, non-profit/public organization, or other commercial entity, though it should be appreciated that embodiments of the invention are not limited to be implemented with commercial entities. It should be additionally appreciated that, as used herein, an "entity," including a commercial entity, may be any single entity, such as a person, group, organization, or business, or any combination of persons, groups, organizations, businesses, or any other entities which may be associated with one another in any suitable manner (e.g., as a business association or a group of businesses sharing infrastructure such as in a shopping mall). It should be appreciated that while various examples are described below in which, for clarity, the entity is described as a commercial entity such as a business or shopping mall, the invention is not limited to being implemented with any particular type or types of entities.

FIG. 1A shows in entity 100 an exemplary implementation of an entity (including entities such as entities 114A and 114B) in accordance with embodiments of the invention. An entity may comprise at least one wireless access point 104, which may be communicatively coupled to a data store 106 and a server 110 associated with the wireless access point 104. Data store 106 may be any suitable computer-readable medium, and may be a component of the wireless access point 104, or may be coupled to the wireless access point 104 directly or through any suitable wired and/or wireless communication medium or media. As shown in FIG. 1A, in some implementations, data store 106 may store information comprising advertisement data that may be retrieved and transmitted by the wireless access point 104. The advertisement data 108 may be any suitable type or types of data that may be transmitted by a wireless access point 104, including, for example, data describing text, images, audio, or video, or any combination thereof. The advertisement data 108 may be data describing a single advertisement for one or more services associated with the entity 100, or may be data describing multiple advertisements for one or more services associated with the entity 100. It should be appreciated that, as discussed above, advertisement data is merely illustrative of the types of data that may be transmitted by wireless access points of wireless networks, and that any suitable type or types of information may be transmitted, as the invention is not limited in this respect.

Server 110 may be any suitable computing apparatus for storing information (e.g., data and/or instructions) to be provided to a client device connected to wireless access point 104. While FIG. 1 shows server 110 as separate from wireless access point 104 and data store 106, in some embodiments of the invention, server 110 may be a component of wireless access point 104 and/or may be implemented as an electronic device comprising a computer-readable medium (or computer-readable media) acting as both a server 110 and a data store 106. In the embodiment illustrated, server 110 is connected to a network that a device may access once it associates with wireless access point 104 and gains access to that network. However, it should be appreciated that the system of FIG. 1A is merely exemplary, and that it is not a requirement of the invention that a wireless access point providing advertising data or other contents ultimately support connections to other networked devices.

The information stored by server 110 may comprise, in some implementations, information related to the one or more advertisements described by the advertisement data 108 stored by data store 106. The information related to the one or more advertisements may be any suitable information, including, for example, one or more web pages describing one or more product(s) or service(s) being advertised by the advertisement data 108. In the embodiments illustrated, data store 106 may not fully define contents of advertisements described by the advertisement data 108. However, such advertisements, for example, may contain a URL pointing to server 110 such that a user may select to connect through wireless access point 104 or any other suitable network connection to server 110 to obtain information related to an advertised service.

Wireless access point 104 may be any suitable wireless signal generator generating signals according to one or more wireless networking protocols. For example, the wireless access points may be WiFi access points operating according to the Institute of Electrical and Electronics Engineers (IEEE) 802.11 standard for Wireless Local Area Networks (WLANs), may be cellular-style wireless access points operating a Wireless Wide Area Network (WWAN) according to any suitable WWAN protocol (e.g., the Global System for Mobile Communications (GSM)), personal area network (PAN) protocols such as Bluetooth, other protocols such as the Worldwide Interoperability for Microwave Access (WiMAX) protocol and the Ultra-wideband (UWB) protocol, or any other suitable wireless protocol. In an entity having multiple wireless access points, the wireless access points may be operating according to the same wireless protocol or may be operating according to different wireless protocols.

As discussed above, systems implementing some of principles disclosed herein may have methods for obtaining trust information for wireless access points and wireless networks other than through the wireless access points and wireless networks themselves (i.e., an out of band source). In some non-preferred implementations, the trust information may be retrieved from the wireless network itself, but it should be appreciated that out of band sources are preferred.

In the embodiment of the FIG. 1A, entity 100 is equipped with a kiosk 102 from which a client device may retrieve trust information. The kiosk 102 may be, for example, an electronic device located within or in proximity to the entity 100. In some implementations, the kiosk 102 may be a device mounted at the entrance to a business or the entrance of a shopping mall, or at locations throughout the business or shopping mall (e.g., mounted on a pillar or wall), which the user may access to retrieve one or more pieces of trust information for that business or shopping mall. The client device 112 may communicate with the kiosk 102 to retrieve the trust information in any suitable manner. In some implementations, the client device 112 may communicate with the kiosk 102 using any suitable wireless protocol, such as a WLAN or PAN protocol or using any suitable Near Field Communication (NFC) protocol (e.g., Radio Frequency Identification (RFID) techniques), or using any suitable wired or contact-based communication techniques. For example, in some implementations, a user may retrieve from the kiosk 102 a memory unit (e.g., a memory card) to be inserted into the client device 112 from which the client device 112 may copy trust information or which the user may keep while shopping at the business or shopping mall (or otherwise interacting with an entity). As discussed above, the trust information retrieved from the kiosk 102 may be any suitable trust information, such as a public key or a PKI certificate for the entity 100.

As shown in FIG. 1A, a client device 112 receiving transmissions from one or more wireless access points 104, 104A, and 104B, may be a laptop personal computer. It should be appreciated, however, that embodiments of the invention are not limited to be implemented with a laptop personal computer, and may be implemented with any suitable electronic device for receiving wireless signals, mobile or immobile, such as a desktop or laptop personal computer, a personal digital assistant (PDA), or smart phone.

The client device 112 may or may not have a connection open to one or more wireless access points 104, 104A, and 104B, but is within range of each of the wireless access points 104, 104A, and 104B and is capable of receiving transmissions from the wireless access points 104, 104A, and 104B. As discussed above, in accordance with embodiments of the invention the transmissions received from the wireless access points 104, 104A, and 104B may comprise any suitable information, including advertisement data 108 stored by the data store 106. In accordance with some illustrative techniques, the transmissions sent by the wireless access points 104, 104A, and 104B and received by the client device 112 may be layer 2 control transmissions. Layer 2 control transmissions such as announcement transmissions may comprise any suitable information about the wireless access point 104, including one or more network characteristics enabling a client device receiving the control transmission to open a connection to the wireless access point 104. As discussed above, an announcement transmission may be, for example, a beacon in accordance with an IEEE 802.11 wireless protocol periodically broadcast by a wireless access point 104 to all client devices within range of the wireless access point 104 (including client device 112), a probe response transmitted to a client device 112 in response to a request for control information sent by the client device 112, or any other suitable announcement transmission sent by a wireless access point 104.

In some embodiments of the invention, a wireless access point 104 may encode in a control transmission the advertisement data 108 stored by the data store 106. As discussed in greater detail below, a client device 112 may be adapted to receive the control transmission comprising content (e.g., the advertisement data 108 or any other suitable content) and read from the control transmission the content. Once read, the content may be processed in any suitable manner, such as providing the advertisements described by the advertisement data 108 to a user of the client device 112 through any suitable user interface. In some advertising frameworks which may implement the techniques described herein for security, a user may then view the advertisements and may indicate to the client device 112 that he or she desires more information on the products or services described by the advertisements. The client device may then establish a connection to a wireless access point transmitting the advertisement in which the user indicated he or she was interested (if the client device 112 does not already have an open connection to the wireless access point), and retrieve any suitable additional information about the one or more services described by the advertisement. The additional information may comprise one or more web pages containing more information about the services or one or more web pages from which the user may order or subscribe to the services. It should be appreciated, however, that in some advertising frameworks implementing the techniques described herein the additional information may not be one or more web pages and may instead be any suitable additional information that may be provided to a user of a client device.

It should be appreciated that the exemplary computer system in FIG. 1A is merely illustrative, and that embodiments of the invention may act in any suitable computer system comprising any suitable number of client devices, entities, and wireless access points. Further, it should be appreciated that entities and wireless access points are not limited to being implemented as shown in the example of FIG. 1A, as embodiments of the invention may be implemented with any suitable entity employing any suitable hardware and/or software.

Figure 1B:
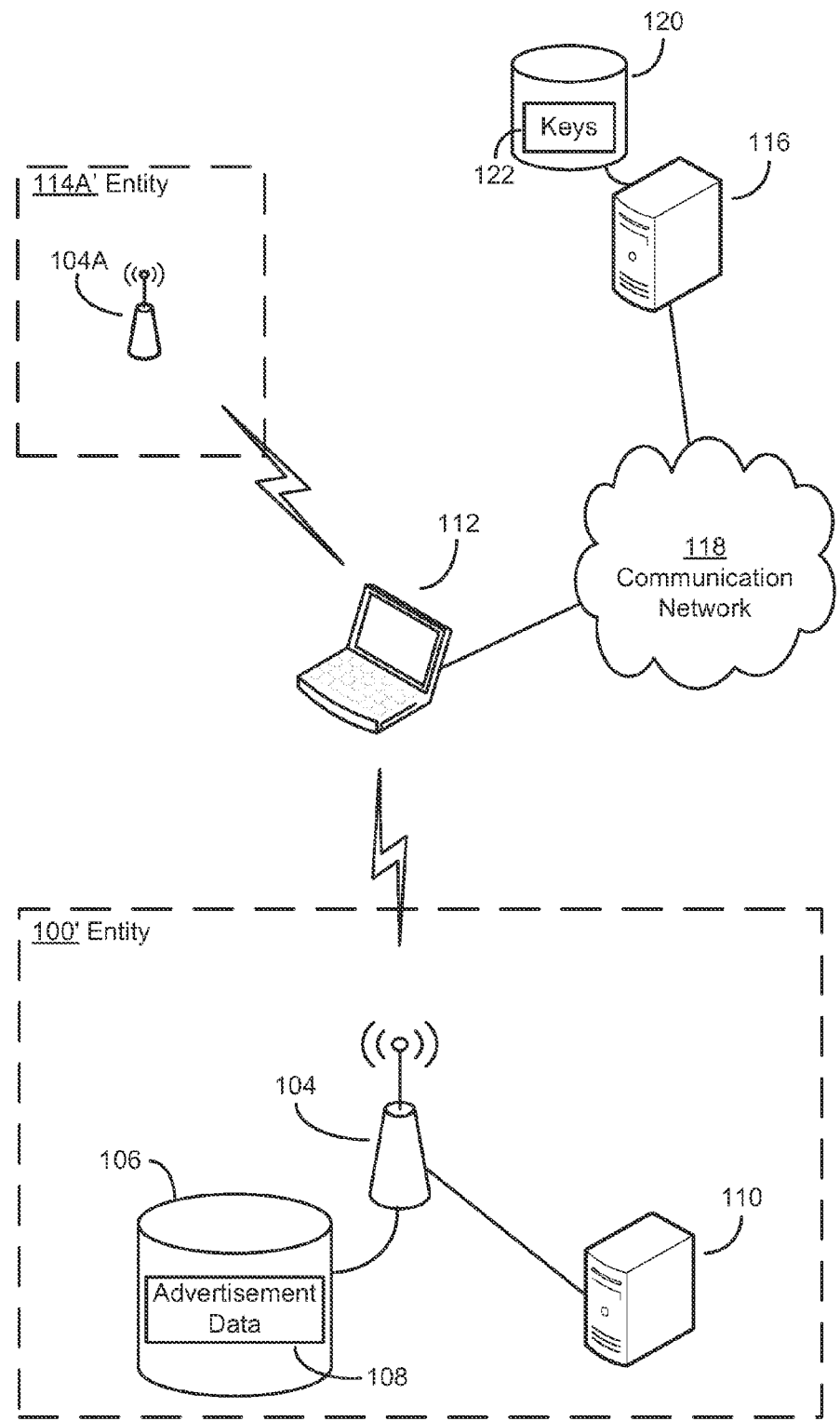
FIG. 1B is a diagram of an exemplary computer system in which some, but not all, of the techniques disclosed herein for transmitting, receiving, and verifying the authenticity of control messages may act, the computer system comprising a web server hosting a web site from which trust information may be retrieved.
Figure 1C:
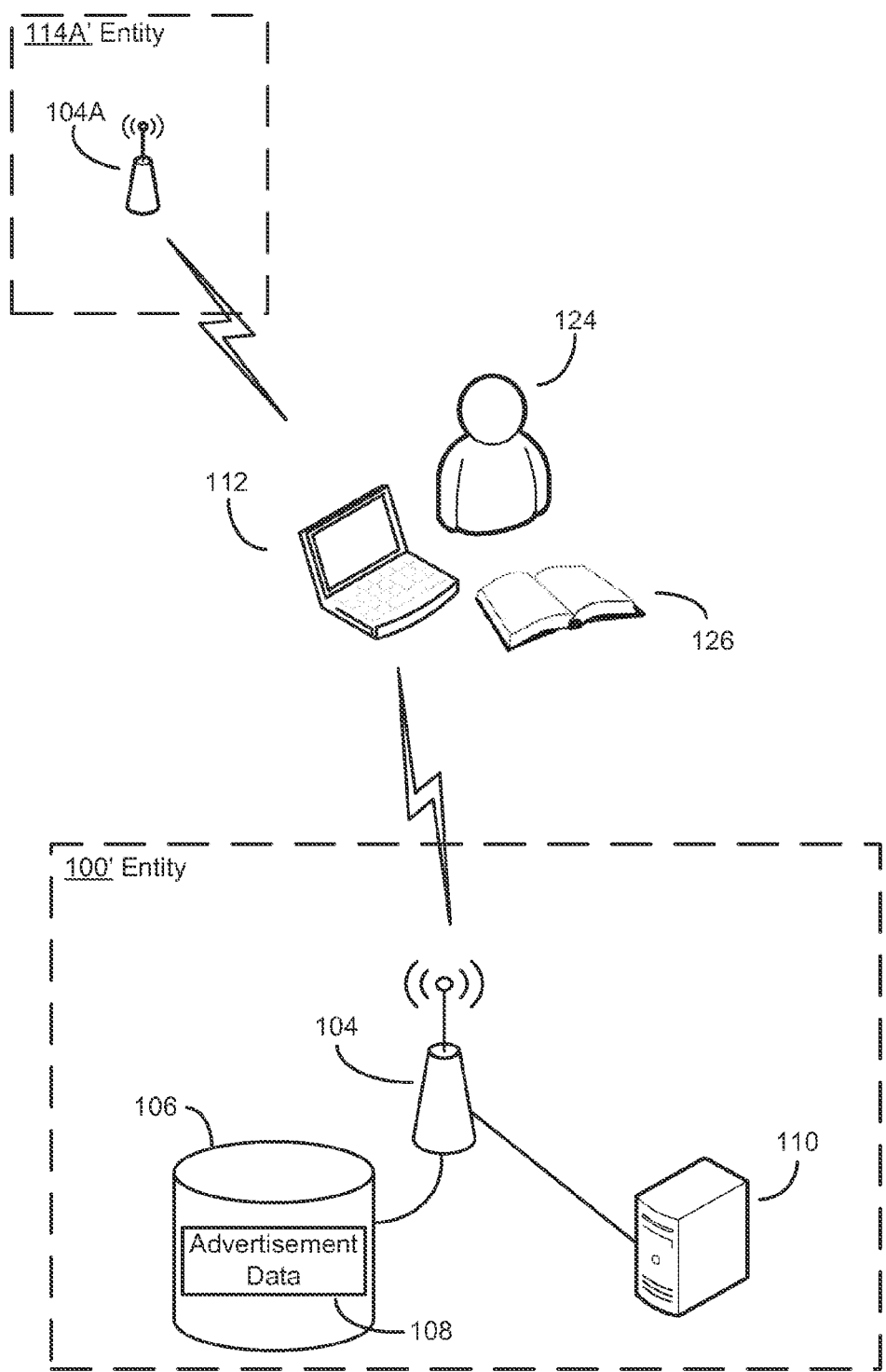
FIG. 1C is a diagram of an exemplary system in which some, but not all, of the techniques disclosed herein for transmitting, receiving, and verifying the authenticity of control messages may act, the system comprising a paper directory from which trust information may be retrieved.

FIGS. 1B and 1C show alternative systems in which techniques implementing some of the principles described herein may act. As shown in FIGS. 1B and 1C, entities 100' and 114A' are substantially similar as the entities shown in FIG. 1A, but the entities are not shown comprising a kiosk 102. Rather, in FIG. 1B, a server 116 is shown communicatively connected to the client device 112 through a communication network 118 comprising any suitable wired and/or wireless communication medium or media. Server 116 may be a server for providing trust information for one or more entities in any suitable manner, such as through a web site or web service, such as the MSN or Windows Live services available from the Microsoft Corporation of Redmond, Wash., that may act as a certificate authority for issuing PKI certificates and/or as a repository for trust information of any type or types. The web site, acting as a repository of trust information may be structured as an on-line directory of trust information for entities, similar to an online directory of telephone numbers. In techniques operating in a system such as the system of FIG. 1B, a user of the client device 112 may retrieve the trust information for an entity (e.g., entity 100' or entity 114A') prior to visiting the entity such that the user does not have to retrieve the trust information from the kiosk 102 or so that the entity does not have to provide the kiosk 102. Alternatively, the client device may retrieve the trust information while visiting the entity (e.g., shopping at a business) by accessing the server 116 through a wireless and/or wired network different than that of the wireless access point 104 (e.g., by accessing a WWAN network).

Server 116 may have a data store 120 comprising one or more pieces of trust information 122 (illustrated in FIG. 1B as "keys," but not so limited) for one or more entities. In some techniques operating in this system, a user may request from the server 116 an individual key for an individual entity, or may request a plurality of keys in any suitable group, such as entities in a certain geographic location or within a certain range of a certain geographic location, entities of a certain type, and/or entities associated with one another in a certain way (e.g., all businesses within a specified shopping mall).

The system of FIG. 1C shows another manner in which a client device 112 may retrieve trust information for one or more entities. In the system of FIG. 1C, a user 124 of the client device 112 may use a physical directory 126 to retrieve the trust information for one or more entities 100' and then manually enter the trust information into the client device 112 through any suitable user interface. The directory may be structured in any suitable manner, such as in a book format similar to a conventional telephone book (as illustrated in FIG. 1C) or as a sign listing trust information which may be displayed (e.g., mounted on a wall) within or near the entity (e.g., in a format similar to the floor map directories in shopping malls or as a sign at the entrance to a business). The directory 126 may provide trust information for one or more entities. In the case where the directory 126 provides information for multiple entities, the listed entities may be those in any suitable grouping, such as entities of a particular type or types, entities within a certain geographic area, or according to any other grouping. A user 124 may use the directory 126 to retrieve trust information for an entity prior to visiting the entity (for example, in the case where a directory 126 is structured like a telephone book), or may use the directory 126 while visiting the entity (for example, in the case where a directory 126 is a sign).

It should be appreciated that, in some implementations, multiple techniques for allowing client devices to retrieve trust information may be implemented in one system. For example, an entity may make its trust information available through a web service and/or a directory and may additionally provide one or more kiosks from which trust information may be retrieved, and may implement any other suitable technique as well, as the invention is not limited to implementing any single technique for providing or retrieving trust information alone or in combination with any other technique(s). It should also be appreciated that the invention is not limited to being performed with the illustrative techniques described above for retrieving trust information, as any suitable technique for retrieving trust information may be implemented in accordance with the principles described herein.

Figure 2:
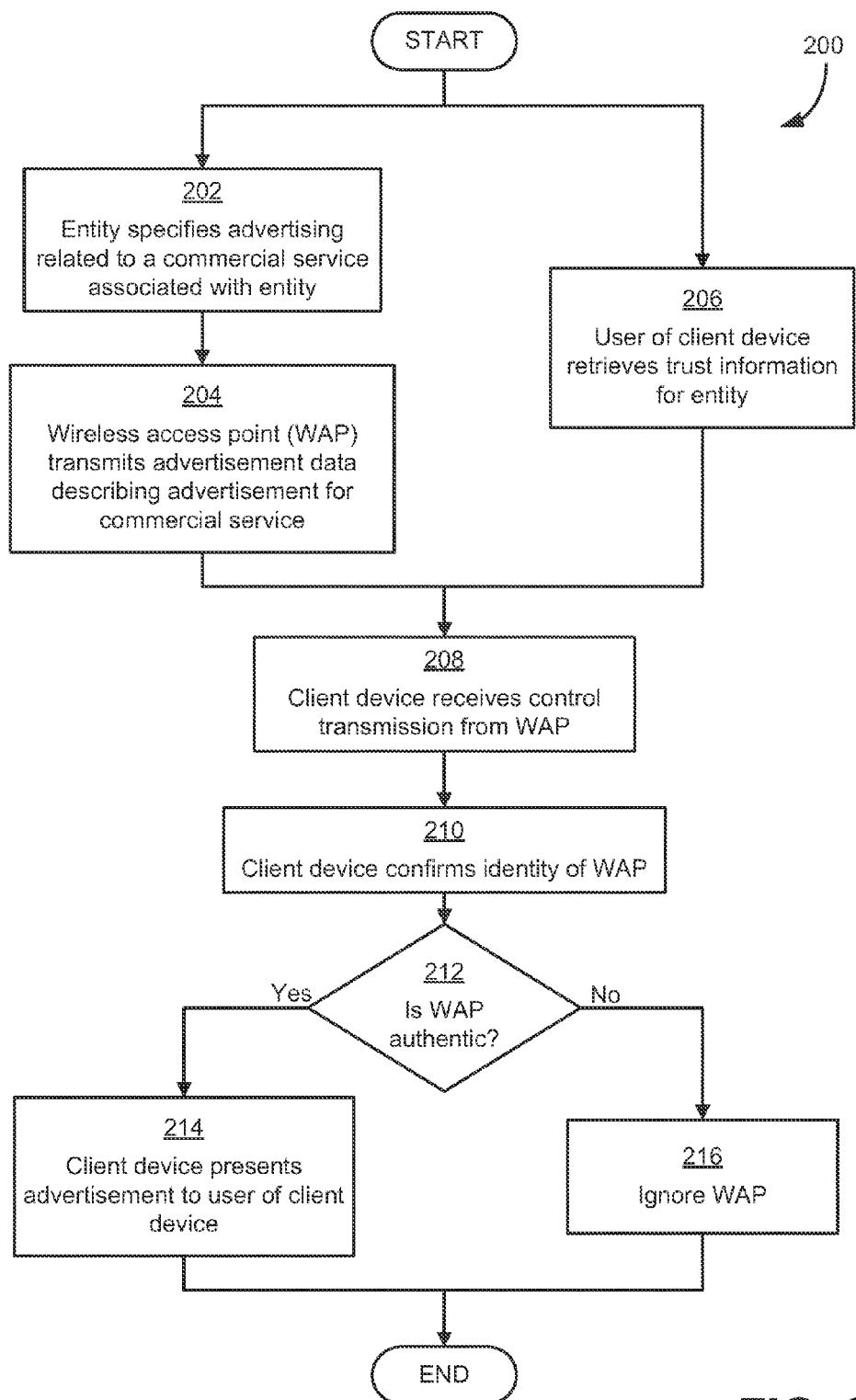
FIG. 2 is a flowchart of an illustrative process implementing some of the principles disclosed herein that may be implemented by a computer system for exchanging information about a commercial service between a wireless network and a client device.

FIG. 2 shows an exemplary process 200 which implements some of the principles disclosed herein for passing content (e.g., information about products and/or services in the form of advertisements) between a wireless access point 104 of an entity 100 and a client device 112. It should be appreciated that the process 200 is merely illustrative and that the invention is not limited to implementing any particular process or processes for exchanging content between a wireless access point and a client device. As discussed above, it should be appreciated that, while process 200 is described in conjunction with advertisements, this type of content is merely illustrative as the invention is not limited to exchanging any particular type or types of content.

The process 200 begins in block 202, wherein an entity (or any person or device associated with an entity) specifies advertising information related to one or more services associated with the entity. The one or more services may be, as shown in FIG. 2, a commercial service, such as sale of a product through any service that may be performed by the entity. For example, if the entity is a restaurant, a commercial service provided by the entity may be serving food and the advertisement relating to the service may describe the specials of the day served by the restaurant. As used herein the term "commercial service" is not limited to services provided by entities for profit. Commercial services may include announcements of events conducted by non-profit or governmental groups, such as free concerts.

In accordance with some techniques implementing the principles described herein, specifying advertising information in block 202 may comprise encoding in a data store associated with the wireless access point data describing one or more advertisements for the specified commercial service, while in other implementations specifying the commercial service may comprise selecting from a list of preconfigured products and/or services which product(s) and/or service(s) are to be the specified commercial service.

In block 204, the wireless access point transmits advertisement data relating to the specified advertisement information for the commercial service. In some implementations, the transmission sent by block 204 may be part of a control transmission sent by the wireless access point and may be, in accordance with some illustrative techniques for transmitting unrequested content, an announcement transmission such as a beacon broadcast periodically to all client devices within range of the wireless access point. The advertising data may be incorporated into the control transmission in any suitable manner. For example, in techniques which are implemented in an IEEE 802.11 wireless network, the advertisement data may be included in an information element of a beacon or probe response, though the invention is not limited to this exemplary technique and may incorporate content into control transmissions in any suitable manner.

In block 206, a client device retrieves trust information (e.g., a public key or PKI certificate) for the entity (i.e., for a wireless network comprising the wireless access point and/or for the wireless access point). This may be done in parallel with the acts 202 and 204, with the trust information being retrieved at the same time advertisement information is specified and transmitted, or may be done at any suitable time after the acts 202 and 204 have been completed. Retrieving trust information may be done in any suitable manner, such as by any of the illustrative techniques discussed above. The trust information may be retrieved from a kiosk, a server holding one or more pieces of trust information, a directory of trust information, and/or any other suitable "out of band" source of trust information.

In block 208, the client device 112 receives the control transmission of block 204 comprising the advertisement data and performs any suitable processing on the transmission. In accordance with the principles disclosed herein, this processing comprises using the trust information in block 210 to confirm the identity of the wireless access point and/or the wireless network to which the wireless access point is connected. The processing of block 210 may be done in any suitable manner, including by any of the processes 300, 400, and 500 described in greater detail below.

In block 212, following the confirmation processing of block 210, the process 200 branches, depending on whether or not the wireless access point is the wireless access point from which the control transmission was received is the wireless access point from which the client device 112 expected to receive content (e.g., whether the wireless access point is authentic or fraudulent). If it is determined that the wireless access point is the expected wireless access point, then in block 214 the client device makes use of the content of the control message by, for example, presenting advertisement data to a user of the client device via a suitable user interface, and the process 200 ends. If, however, in block 212 the wireless access point is determined not to be the expected wireless access point, then in block 216 the wireless access point (and control messages transmitted by it) are ignored for a suitable period of time (e.g., minutes, days, until the client device exits the range of the wireless access point, until new trust information is obtained, forever, or any other suitable period of time).

It should be appreciated that process 200 is merely illustrative of techniques which implement some of the principles described herein, and that the invention is not limited to implementing a process such as process 200 or any particular process executing one or more acts of the process 200. Any suitable technique(s) for exchanging information about products and/or services between a wireless access point associated with an entity and a client device may be implemented in accordance with the principles described herein. For example, in alternative techniques, while FIG. 2 describes process 200 in terms of a commercial service being advertised by a commercial entity, embodiments of the invention may be implemented by entities which are not commercial entities, and as such the product(s) and/or service(s) associated with the entity may not be commercial services. Additionally, it should be appreciated that some alternative techniques may implement the acts shown in FIG. 2 in a different order. As an example, in some techniques operating in accordance with the principles described herein, a client device 112 may confirm the identity of a wireless access point 102 prior to receiving any control transmissions comprising advertisement data (or other content), such that the acts described above of confirming the identity of a wireless access point and/or wireless network (i.e., acts 210 and 212) may be executed prior to the act 208.

Figure 3:
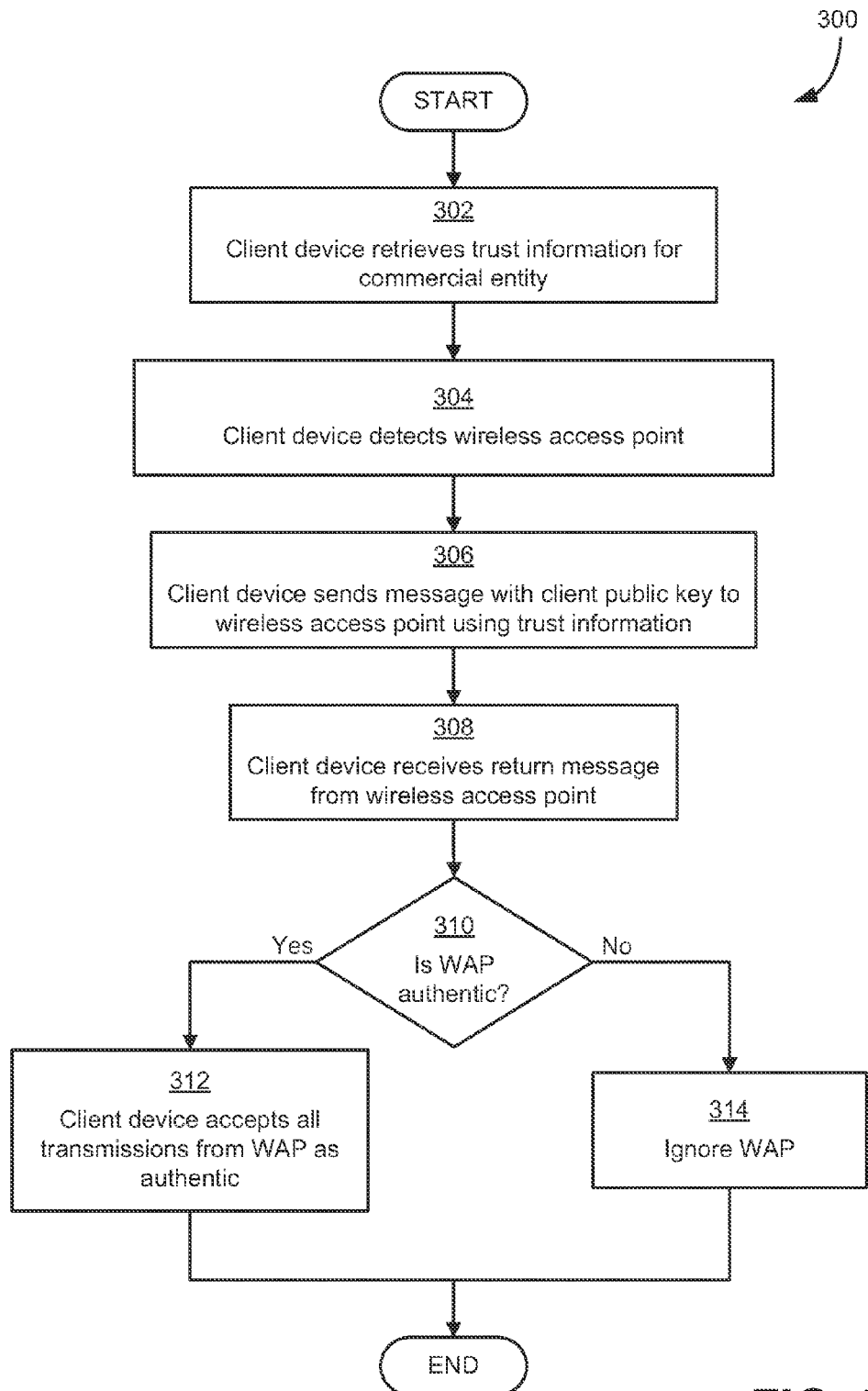
FIG. 3 is a flowchart of one exemplary technique implementing some of the principles disclosed herein for confirming the authenticity of a wireless access point of a wireless network.
Figure 4:
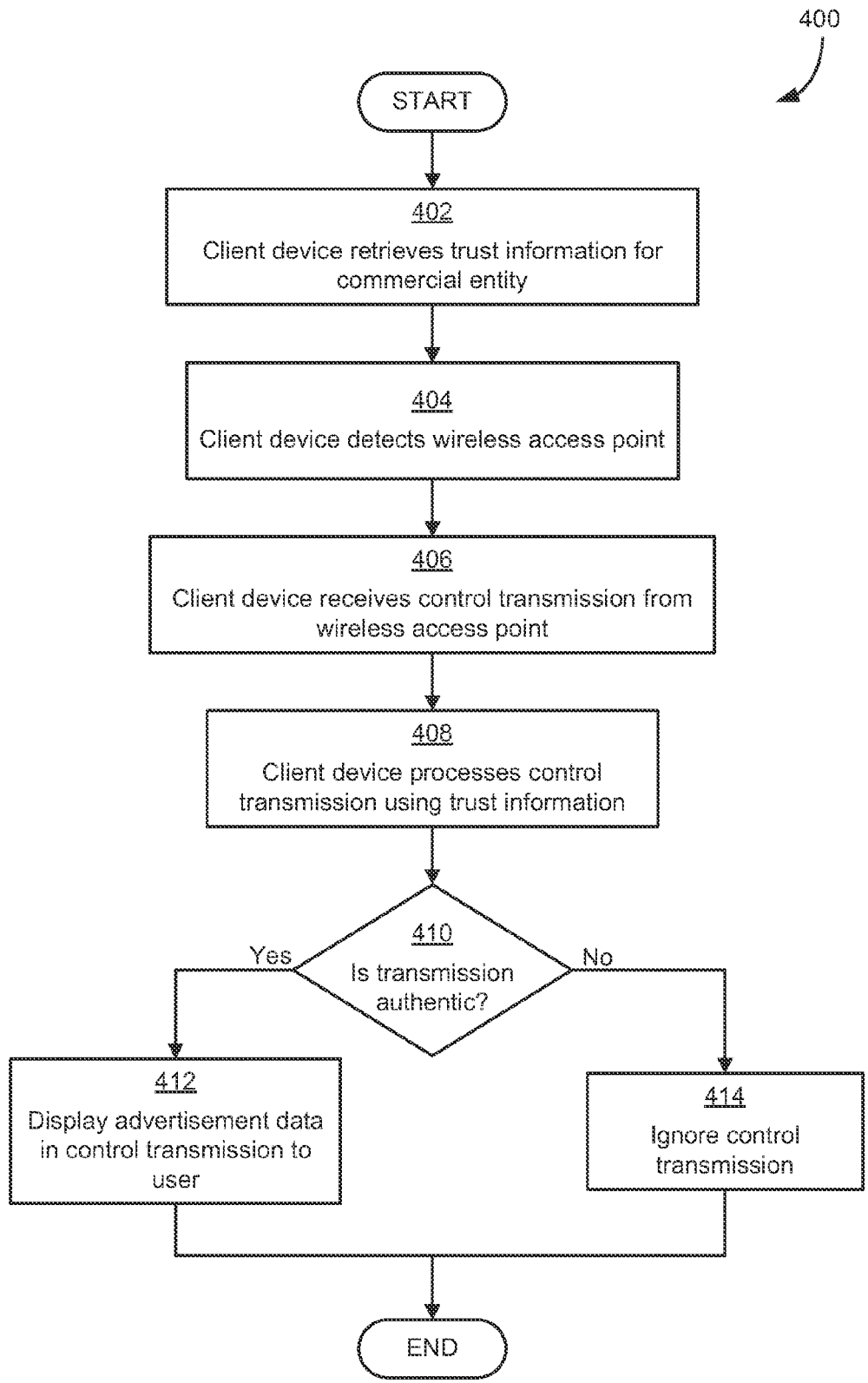
FIG. 4 is a flowchart of one exemplary technique implementing some of the principles disclosed herein for confirming the authenticity of control messages received from a wireless access point of a wireless network.
Figure 5:
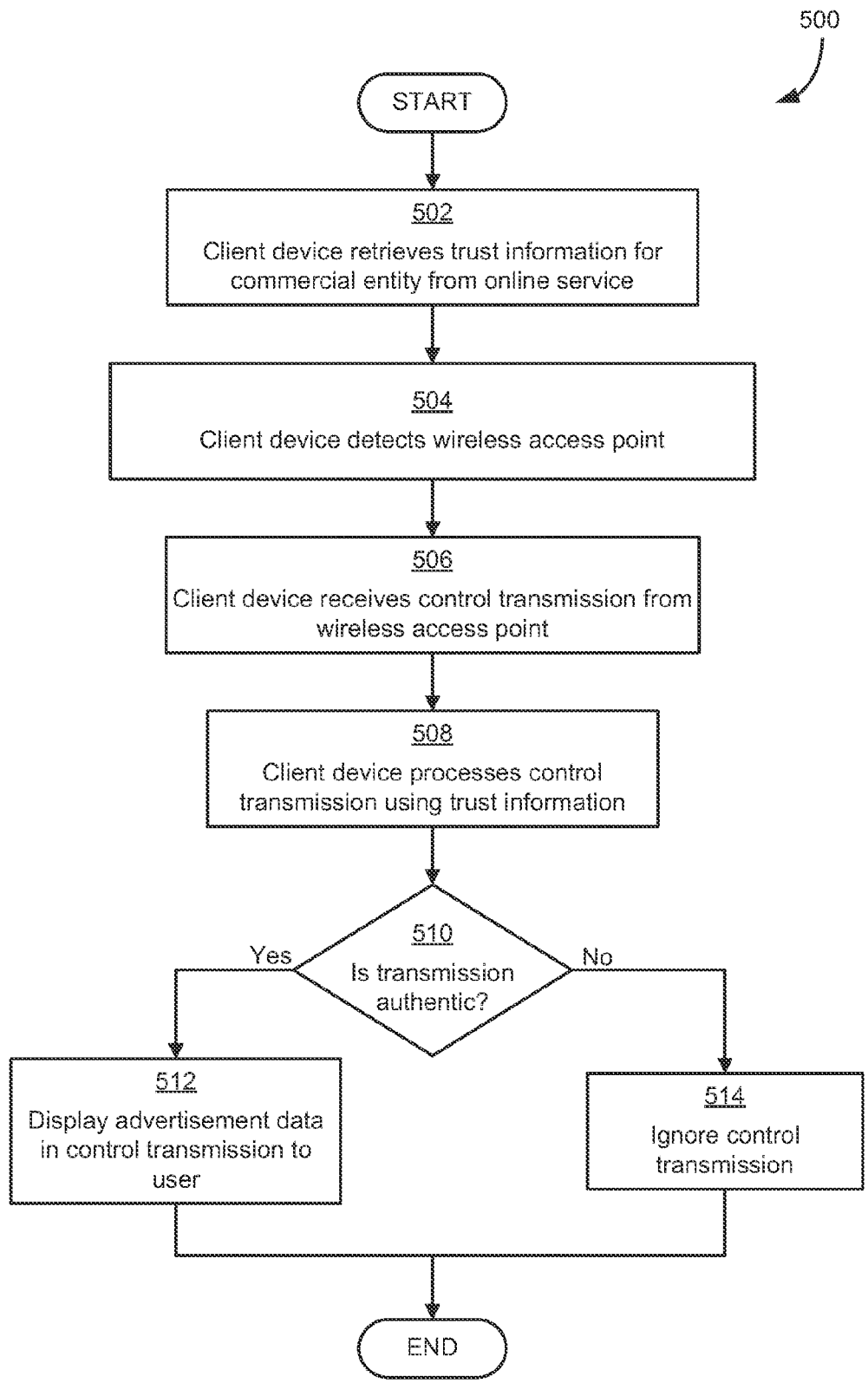
FIG. 5 is a flowchart of another exemplary technique implementing some of the principles disclosed herein for confirming the authenticity of control messages received from a wireless access point of a wireless network.

As mentioned above in connection with process 200, confirming the identity of a wireless access point and/or wireless network (as in block 210 of process 200) may be done in any suitable manner. Discussed below in connection with FIGS. 3-5 are illustrative techniques for confirming the identity of wireless access points and/or wireless networks. It should be appreciated, however, that these techniques are merely exemplary of the types of techniques that may be implemented in accordance with the principles described herein, and that other techniques are possible.

FIG. 3 shows an exemplary process 300 by which the identity of a wireless access point may be confirmed. As above, while FIG. 3 is discussed in connection with advertisements and commercial entities, any suitable type or types of content may be used.

Process 300 begins in block 302, in which the client device retrieves trust information for one or more commercial entities. The trust information may comprise a public key and/or PKI certificate for the entity, and may be retrieved in any suitable manner, such as from a kiosk associated with the entity. In block 304, the client device detects that it is within range of a wireless access point for which it has trust information (e.g., by comparing an identifier for the detected wireless access point to identifiers for the trust information). In block 306, the client device transmits to the wireless access point a test control transmission which is encrypted using the trust information. The test control transmission may comprise any suitable information, and may include a challenge phrase and/or a nonce. Any suitable message may be used in the test control transmission (e.g., a random or pseudo-random bit string, unique text such as "Red trees are blue," a transmission time and/or transmission location, or any other suitable data). In some techniques operating according to the example of FIG. 3, the payload of the test control transmission may also comprise trust information for the client device 112, such as a public key/PKI certificate for the client device and/or a public key/PKI certificate for the user (collectively referred to below, for clarity, as the client trust information).

In block 308, the client device receives from the wireless access point a control transmission in response to the test control message. The response control transmission may comprise the contents of the test control transmission sent unencrypted or, in the implementations in which the test control message additionally included client trust information, the content of the response control message may be sent back encrypted using the client trust information. If, upon receiving (and, in some techniques, decrypting) the response control transmission the client device determines that the contents match what was encrypted and transmitted (e.g., the contents of the test control transmission), then the client device may assume that the wireless access point holds the private key corresponding to the public key with which the contents of the test control transmission was encrypted and, therefore, that the wireless access point with which the client device is exchanging messages is the expected wireless access point.

In block 310, if the wireless access point is the expected wireless access point (e.g., if the wireless access point is authentic) then the client device may accept all future transmissions from the wireless access point as authentic, and use the contents of control messages freely (e.g., may display advertisements transmitted by the wireless access point to the user), and the process ends. If, however, in block 310 the wireless access point is determined not to be the expected wireless access point, then in block 314 the client device may ignore the wireless access point and control transmissions from the wireless access point for any suitable period of time.

In some implementations of techniques operating according to the example of FIG. 3, control messages comprising content (e.g., advertisement data) may not be transmitted encrypted, but rather are sent unencrypted. In some alternative implementations, following the authentication techniques of process 300, the wireless access point may, as an alternative to or in addition to broadcasting control messages, send to the client device control messages which are encrypted using the client trust information. In other embodiments, all or a portion of the control messages comprising content which are transmitted by the wireless access point are encrypted using the trust information for the wireless access point and the client device would decrypt each message using the trust information prior to using the contents (e.g., displaying the contents to a user).

In some techniques implementing the principles disclosed herein, confirmation of the identity of a wireless access point may rely on only the correct decryption of control messages for confirming the identity of a wireless access point and/or wireless network. FIG. 4 shows a process 400 which is illustrative of such techniques. As before, process 400 is discussed below in connection with advertisements for commercial entities, but techniques which may be implemented in accordance with some of the principles disclosed herein may exchange any suitable type or types of information as content of control messages.

Process 400 begins in block 402, in which the client device retrieves trust information for a commercial entity. The trust information may be retrieved in any suitable manner, such as by reading the trust information from a kiosk associated with the commercial entity. In block 404, the client detects that it is within range of a wireless access point for which it has trust information (e.g., by comparing an identifier for the detected wireless access point to identifiers for the trust information) and, in block 406, receives a control transmission (e.g., a beacon or a response to a probe request sent by the client device) from the wireless access point.

In block 408, the client device 112 processes the control transmission using the trust information retrieved in block 402 to confirm the identity of the wireless access point. Processing the control transmission may comprise using the trust information to decrypt the control transmission. If the control transmission can be correctly decrypted using the retrieved trust information, then the client device 112 may assume that the control transmissions were encrypted using a private key corresponding to the public key of the trust information, and thus that the wireless access point is the expected wireless access point and the transmission is authentic.

If, in block 410, it is determined that the transmission is authentic, then in block 412 the content of the control transmission may be used in any suitable manner, such as by extracting the advertisement and displaying it to a user, and the process ends. If, however, in block 410 the transmission is determined not to be authentic (i.e., the transmission cannot be confirmed to come from the expected wireless access point), then in block 414 the wireless access point is ignored for any suitable period of time, and the process ends without the contents being used.

FIG. 5 shows an alternative process 500 operating in accordance with some of the principles disclosed herein. Process 500 begins in block 502, in which the client device 112 retrieves trust information for a commercial entity. The trust information may be retrieved in any suitable manner, such as by retrieving the trust information from a server such as a server 116 that may, in some implementations of techniques operating according to the example of FIG. 5, implement a web service acting as a certificate authority and/or as a repository of trust information. The trust information retrieved in block 502 may be a single piece of trust information, or may be multiple pieces of trust information retrieved in any suitable grouping. In some implementations, the trust information may be retrieved in response to a user request, while in some implementations the client device 112 may be adapted to retrieve, additionally or alternatively, the trust information automatically in response to any suitable stimulus. The stimulus may be a time or location (e.g., when the client device detects that it is near the location of an entity), a detection of a wireless access point associated with an entity, an indication received from the server 116 that previously-retrieved trust information has been added or changed, or any other suitable stimulus.

In block 504, the client device 112 detects that it is within range of a wireless access point for which it has trust information (e.g., by comparing an identifier for the detected wireless access point to identifiers for the trust information) and, in block 506, receives a control transmission (e.g., a beacon or a response to a probe request sent by the client device) from the wireless access point.

In block 508, the client device 112 processes the control transmission using the trust information retrieved in block 502 to confirm the identity of the wireless access point. Processing the control transmission may comprise using the trust information to decrypt the control transmission. If the control transmission may be correctly decrypted using the retrieved trust information, then the client device 112 may assume that the control transmissions were encrypted using a private key corresponding to the public key of the trust information, and thus that the wireless access point is the expected wireless access point and the transmission is authentic.

If, in block 510, it is determined that the transmission is authentic, then in block 512 the content of the control transmission may be used in any suitable manner, such as by extracting the advertisement and displaying it to a user, and the process ends. If, however, in block 510 the transmission is determined not to be authentic (i.e., the transmission cannot be confirmed to come from the expected wireless access point), then in block 514 the wireless access point is ignored for any suitable period of time, and the process ends without the contents being used.

It should be appreciated that the techniques described above in conjunction with FIGS. 3-5 are merely exemplary of the types of techniques that may implement some of the principles described herein for confirming the identity of wireless networks and/or wireless access points. It should be appreciated that the invention is not limited to implementing any particular one of these techniques, or limited to implementing any technique, as any suitable techniques may be implemented in accordance with the principles disclosed herein.

While the exemplary techniques described above focused on confirming the identity of a wireless access point and/or wireless network by decrypting control messages encrypted using trust information, the invention is not so limited. Techniques may be implemented that additionally or alternatively confirm the identity of wireless networks in other ways, including using environment information. For example, trust information for a wireless access point or wireless network may be an expected location for the wireless access point or wireless network and may be compared to location of the client device when within range of the wireless access point and/or to location information included in a control transmission from the wireless access point. In this manner, if the client device detects the wireless access point when it is not at the expected location, or if the location information in the control transmission is not the expected location information, then the detected wireless access point may be fraudulent. Location information which may be used may be any suitable location information, such as a street address, position within a building, latitude/longitude data, and/or any other suitable location information. Additionally or alternatively, environment information may comprise time information for the control transmission. Time information may be, for example, included in a control transmission describing a time at which the control transmission was first transmitted. A client device, upon receiving the control transmission, may compare the time information for the control transmission to trust information comprising a current time. The trust information may be used to determine if the broadcast time is within a reasonable difference from the current time. For example, if the difference between the broadcast time for a control transmission and the current time is greater than a certain amount of time (e.g., 10 seconds), the client device may determine that it is being subjected to a reply attack by a device rebroadcasting control transmissions, and determine that the detected wireless access point is fraudulent. Other embodiments may implement other techniques for confirming the identity of a wireless access point and/or wireless network, as the invention is not limited in this respect.

Figure 6:
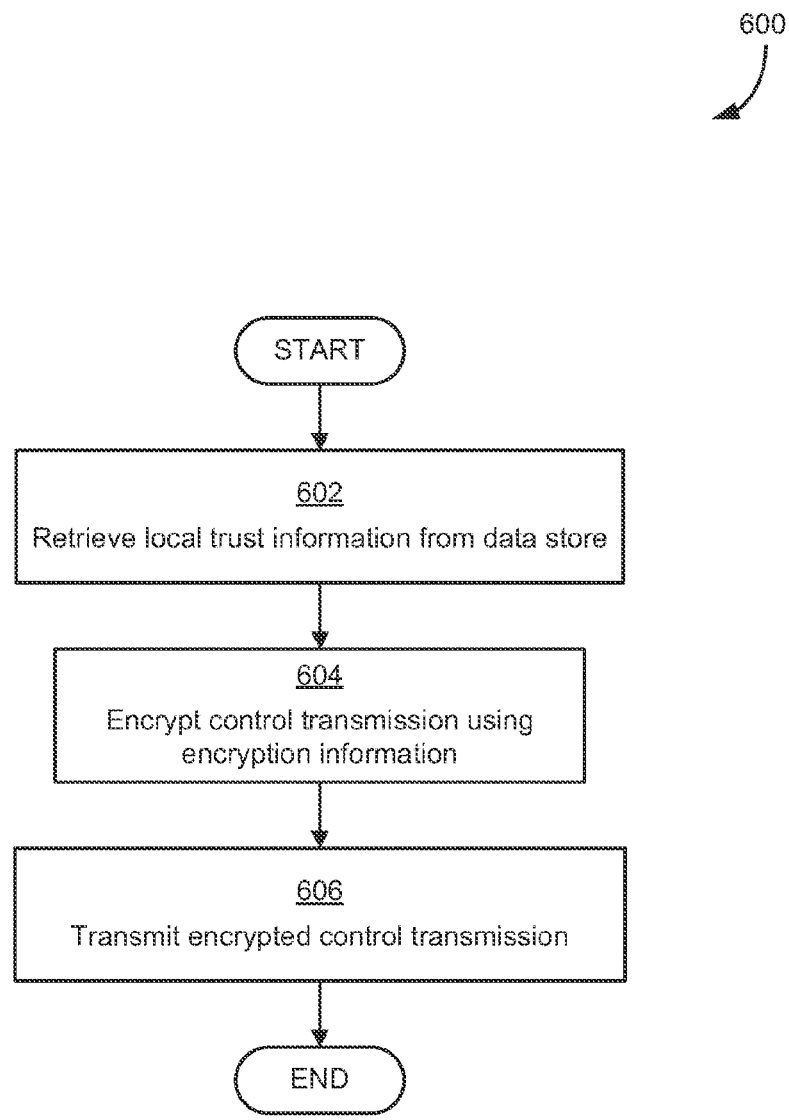
FIG. 6 is a flowchart of an exemplary technique implementing some of the principles disclosed herein which may be used by wireless access points to transmit control messages.

Discussed above are various techniques that may be used by client devices to implement some of the principles described herein. It should be appreciated, however, that in some systems implementing one or more of the principles described herein one or more elements of the wireless network to which a client device is connecting may execute techniques in accordance with these principles. FIG. 6 shows an exemplary process 600 that may be implemented by a wireless access point in accordance with some of these principles.

Process 600 begins in block 602, wherein the wireless access point retrieves local trust information from a data store. The local trust information may comprise any suitable trust information, such as a private key that may be used in a public key cryptography algorithm or any other suitable local trust information. In block 604, content is retrieved from data store 106 and encoded in a control transmission, and the control transmission is encrypted using the local trust information of block 602. The content encrypted in block 604 may be any suitable content, such as advertisement data, location data, data described one or more services offered by the wireless access point and/or the wireless network (e.g., printing services), or any other type of information. In block 606 the control transmission is then transmitted by the wireless access point. In some implementations, the control transmission may be transmitted as a beacon to all client devices within range of the wireless access point, while in alternative implementations the control transmission may be sent as a response to a probe request received by the wireless access point from a client device, or as any other suitable control transmission.

Figure 7:
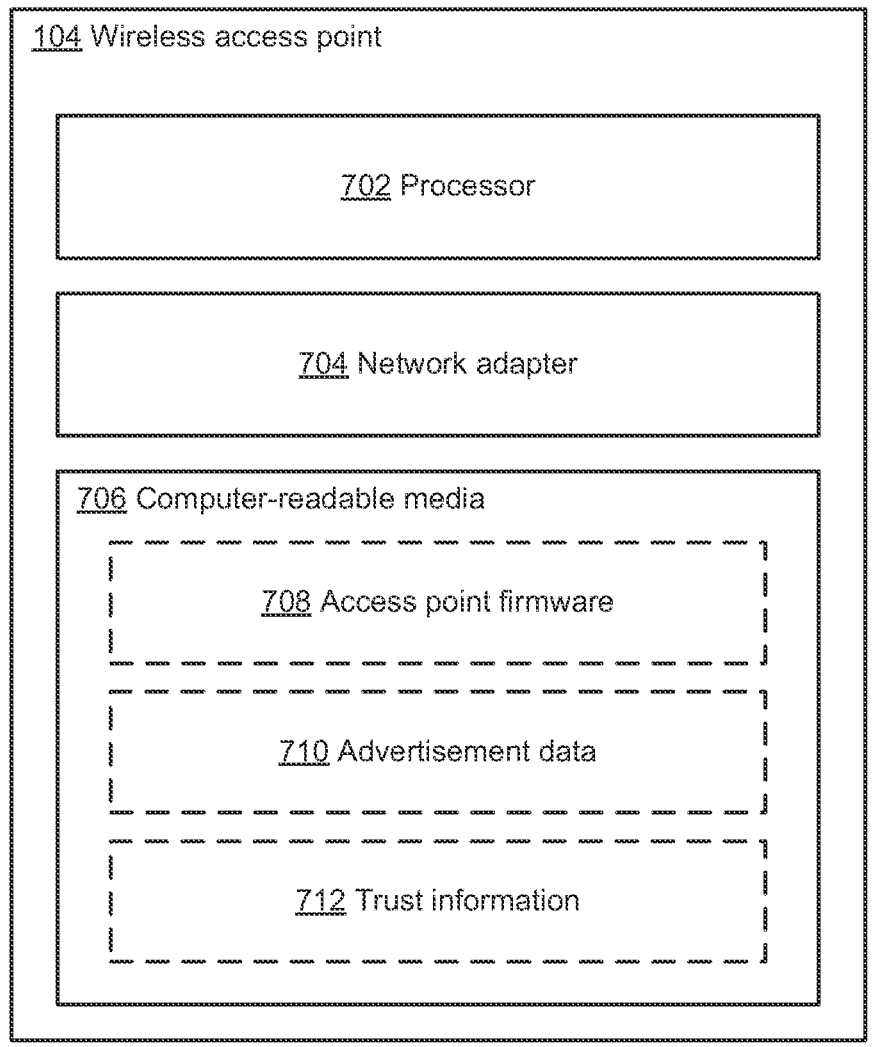
FIG. 7 is a block diagram of an exemplary wireless access point which may implement some, but not all, of the techniques disclosed herein for transmitting and verifying the authenticity of control messages.
Figure 8:
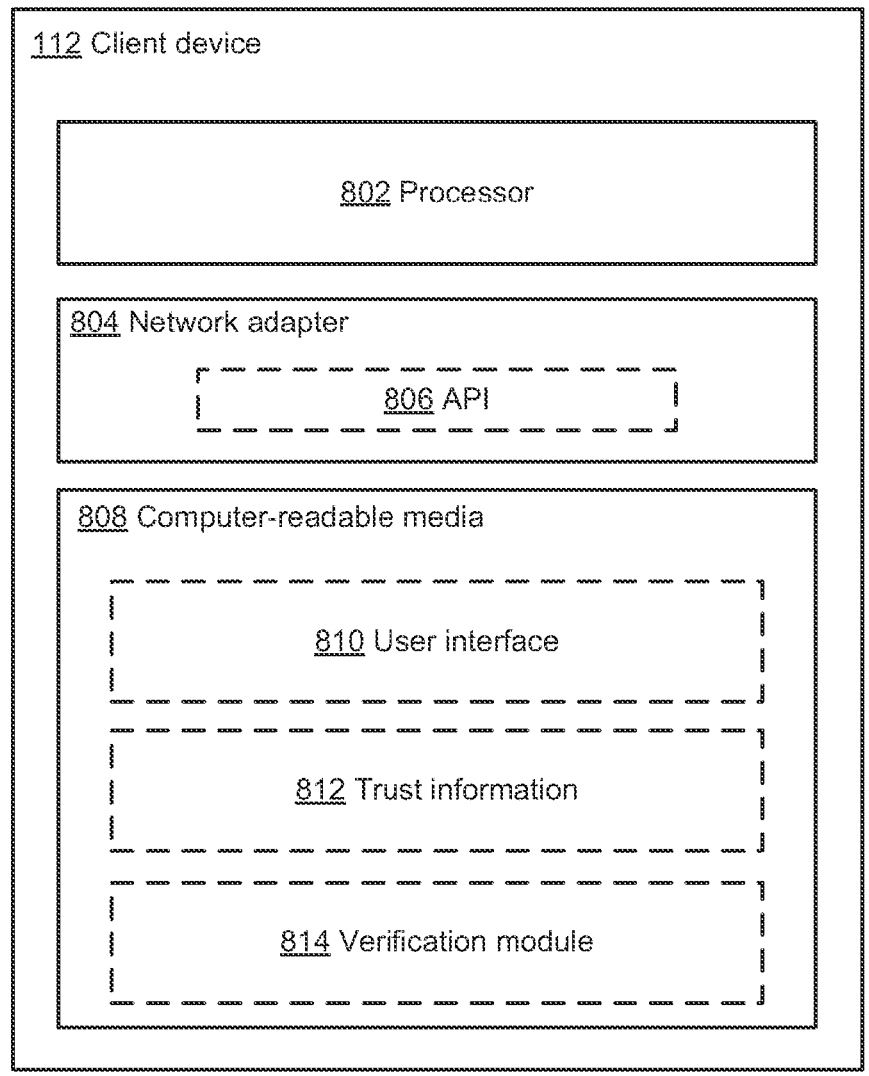
FIG. 8 is a block diagram of an exemplary client device which may implement some, but not all, of the techniques disclosed herein for receiving and verifying the authenticity of control messages received from wireless access points of wireless networks.

Techniques implementing one or more of the principles described herein may be implemented on any of numerous computer system configurations and are not limited to any particular type of configuration. FIGS. 7-8 show various computer systems in which embodiments of the invention may act, though others are possible. It should be appreciated that FIGS. 7-8 are intended to be neither a depiction of necessary components for a computing device to operate as a wireless access point or client device, nor a comprehensive depiction.

FIG. 7 shows an illustrative wireless access point 104. Wireless access point 104 comprises a processor 702, a network adapter 704, and computer-readable media 706. Network adapter 704 may be any suitable hardware and/or software to enable the wireless access point 104 to communicate with any other suitable computing device over any suitable computing network. The computing network may be any suitable wired and/or wireless communication medium or media for exchanging data between two or more computers, including the Internet. For example, the computing network may be, at least in part, a wireless network operating according to any suitable wireless networking protocol, such as IEEE 802.11, GSM, Bluetooth, WiMAX, UWB, and/or any other suitable protocol. In some embodiments of the invention, wireless access point 104 may comprise two network adapters 704 to enable the wireless access point 104 to communicate with two different communication networks—for example, a wired computing network and a wireless computing network—and exchange data between the two. Computer-readable media 706 may be adapted to store data to be processed and/or instructions to be executed by processor 702. Processor 702 enables processing of data and execution of instructions. The data and instructions may be stored on the computer-readable media 706 and may, for example, enable communication between components of the wireless access point 104.

In accordance with some of the exemplary techniques described herein, data store 106 of FIGS. 1A, 1B, and 1C may be implemented as computer-readable media 706, and the data and instructions stored on computer-readable media 706 may comprise access point firmware 708, which may be software executed by the processor 702 instructing the wireless access point 104 to perform any suitable function, such as retrieving content (e.g., advertisement data 710 or other suitable content) from a data store for transmission, encoding the content in a control transmission, and generating a control transmission. The computer-readable media 706 may further store content such as advertisement data 710 (i.e., advertisement data 108). Advertisement data 710 may be any suitable type or types of data that may be transmitted by a wireless access point 104, including, for example, data describing text, images, audio, or video, or any combination thereof. The advertisement data 710 may be data describing a single advertisement for one or more services associated with an entity associated with the wireless access point 104, or may be data describing multiple advertisements for one or more services associated with an entity. In embodiments of the invention, the entity may be a commercial entity (e.g., a business) and the services may be commercial services. It should be appreciated, as discussed above, that advertisement data is merely illustrative of the type of content that may be transmitted by a wireless access point 104 in accordance with one or more of the principles described herein.

In accordance with some of the exemplary techniques described herein, computer-readable media 706 may further hold trust information 712 for the wireless access point 104 and/or a wireless network to which the wireless access point is connected. The trust information 712 may be any suitable trust information, such as a private key for the wireless access point 104 and/or wireless network to be used in a public key cryptography algorithm. It should be appreciated, however, that any suitable trust information may be used as trust information 712, including, for example, environment information, as a private key is merely illustrative of the types of information that may be used as trust information in accordance with the principles described herein.

FIG. 8 shows an exemplary client device 112 which may be implemented as a client device in accordance with the principles described herein. As discussed above, any suitable computing device, mobile or immobile, may be used as a client device 112. Client device 110 may be a computing device designed for multiple purposes and for use by a user, such as a desktop personal computer, a laptop personal computer, a server, a personal digital assistant (PDA), a smart/mobile telephone, or any other suitable electronic device. Alternatively, client device 110 may be any computing device not intended for typical use by a user or intended for a single purpose or limited purposes, such as a server or a rack-mounted networking device.

Client device 112 comprises a processor 802, a network adapter 804, and computer-readable media 808. Network adapter 804 may be any suitable hardware and/or software to enable the client device 112 to communicate with any other suitable computing device over any suitable computing network. The computing network may be any suitable wired and/or wireless communication medium or media for exchanging data between two or more computers, including the Internet. For example, the computing network may be, at least in part, a wireless network operating according to any suitable wireless networking protocol, such as IEEE 802.11, GSM, Bluetooth, WiMAX, UWB, and/or any other suitable protocol. Network adapter 804 may further comprise an Application Programmer Interface (API) 806 to enable interaction between the network adapter 804 and applications executing on the client device 112. API 806 may provide executable functions to applications on the client device 112 such that the applications may request that network adapter 804 begin monitoring for transmissions from wireless access points, provide content from transmissions (e.g., advertisement data, location data, or any other suitable content), request additional information from the wireless access points, or any other suitable function. Computer-readable media 806 may be adapted to store data to be processed and/or instructions to be executed by processor 802. Processor 802 enables processing of data and execution of instructions. The data and instructions may be stored on the computer-readable media 806 and, for example, may enable communication between components of the client device 112.

In accordance with some embodiments of the invention, the data and instructions stored on computer-readable media 808 may comprise a user interface 810 by which the content of control transmissions received by the network adapter 804 (e.g., advertisement data and/or additional information regarding advertised product(s) or service(s)) may be presented to a user. User interface 810 may present content in any suitable format. In some embodiments of a client device 112, the user interface 810 may be a component of an operating system or firmware of the client device 112, while in alternative embodiments of the invention the user interface 810 may be a standalone application, or a piece of an application such that the content may be displayed and used within the application.

In accordance with one or more of the principles described herein, computer-readable media 808 of the client device 112 may further comprise a data store of trust information 812. The trust information 812 may be one or more pieces of trust information for one or more wireless access points and/or wireless networks, and may comprise any suitable type or types of trust information. For example, as discussed above, the trust information may be public keys and/or PKI certificates for the wireless access points and/or wireless networks, and/or may be environment information such as time or location data for the wireless access points and/or wireless networks.

Computer-readable media 808 may further comprise a verification module 814 to test control messages received by the network adapter 804, using the trust information 812, to determine the authenticity of a wireless access point and/or wireless network. Verification module 814 may implement any suitable technique, including, but not limited to, any one or more of the exemplary techniques discussed above. In some implementations, the verification module 814 may be incorporated into an operating system of the client device 112, while in alternative implementations the verification module 814 may be implemented separate from the operating system, for example, as a stand-alone application executing on the client device 112 or in any other suitable manner.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer storage medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method performed on a client computing device, the method comprising:
    obtaining, by the client computing device, trust information related to a wireless access point from a source other than the wireless access point;
    receiving, by the client computing device from the wireless access point while the client computing device is not connected to any network to which access is provided by the wireless access point, an unrequested message that is encrypted;
    decrypting, by the client computing device based on the obtained trust information, the received unrequested message;
    verifying, by the client computing device based on successful decryption of the received unrequested message, the received unrequested message or an identity of the wireless access point; and
    accepting, by the client computing device in response to the verifying, the decrypted message.

2. The method of claim 1 where the trust information is obtained from a directory.

3. The method of claim 1 where the trust information is obtained from a sign.

4. The method of claim 1 where the trust information is obtained from a server or a web service.

5. The method of claim 1 where the accepted message comprises location information corresponding to the wireless access point.

6. The method of claim 1 where the trust information comprises a public key associated with the wireless access point.

7. The method of claim 1 where the trust information comprises a public key infrastructure ("PKI") certificate.

8. A system comprising:
    a client computing device configured to obtain trust information related to a wireless access point from a source other than the wireless access point;
    a network adapter configured to receive, from the wireless access point while the client computing device is not connected to any network to which access is provided by the wireless access point, an unrequested message that is encrypted;
    a processor configured to decrypt, device based on the obtained trust information, the received unrequested message;
    the client computing device further configured to verify, based on successful decryption of the received unrequested message, the received unrequested message or an identity of the wireless access point; and
    the client computing device further configured to accept, in response to the verified message or the verified identity of the wireless access point, the decrypted message.

9. The system of claim 8 where the trust information is obtained from a directory.

10. The system of claim 8 where the trust information is obtained from a sign.

11. The system of claim 8 where the trust information is obtained from a server or a web service.

12. The system of claim 8 where the accepted message comprises location information corresponding to the wireless access point.

13. The system of claim 8 where the trust information comprises a public key associated with the wireless access point.

14. The system of claim 8 where the trust information comprises a public key infrastructure ("PKI") certificate.

15. At least one computer-readable medium comprising:
    memory that comprises computer-executable instructions that, based on execution by a client computing device, configure the client computing device to:
        obtain trust information related to a wireless access point from a source other than the wireless access point;
        receive, from the wireless access point while the client computing device is not connected to any network to which access is provided by the wireless access point, an unrequested message that is encrypted;
        decrypt, based on the obtained trust information, the received unrequested message;
        verify, based on successful decryption of the received unrequested message, the received unrequested message or an identity of the wireless access point; and
        accept, based on the verified successful decryption of the received unrequested message or the verified identity of the wireless access point, the decrypted message.

16. The at least one computer-readable medium of claim 15 where the trust information is obtained from a directory.

17. The at least one computer-readable medium of claim 15 where the trust information is obtained from a sign.

18. The at least one computer-readable medium of claim 15 where the trust information is obtained from a server or a web service.

19. The at least one computer-readable medium of claim 15 where the accepted transmission comprises location information corresponding to the wireless access point.

20. The at least one computer-readable medium of claim 15 where the trust information comprises a public key associated with the wireless access point, or where the trust information comprises a public key infrastructure ("PKI") certificate.

* * * * *